United States Patent
Egashira et al.

(10) Patent No.: US 11,177,713 B2
(45) Date of Patent: Nov. 16, 2021

(54) ROTATING ELECTRIC MACHINE HAVING TERMINALS BENT TO FORM JOINED PORTIONS

(71) Applicant: Mitsubishi Electric Corporation, Tokyo (JP)

(72) Inventors: Kohei Egashira, Tokyo (JP); Masashi Nakamura, Tokyo (JP); Tatsuro Hino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 183 days.

(21) Appl. No.: 16/489,032

(22) PCT Filed: Apr. 6, 2017

(86) PCT No.: PCT/JP2017/014345
§ 371 (c)(1),
(2) Date: Aug. 27, 2019

(87) PCT Pub. No.: WO2018/185902
PCT Pub. Date: Oct. 11, 2018

(65) Prior Publication Data
US 2020/0067364 A1    Feb. 27, 2020

(51) Int. Cl.
*H02K 3/28*       (2006.01)
*H02K 11/25*    (2016.01)
(Continued)

(52) U.S. Cl.
CPC ............... *H02K 3/28* (2013.01); *H02K 1/16* (2013.01); *H02K 3/14* (2013.01); *H02K 3/34* (2013.01);
(Continued)

(58) Field of Classification Search
CPC ............ H02K 1/16; H02K 1/165; H02K 3/04; H02K 3/14; H02K 3/28; H02K 3/30;
(Continued)

(56) References Cited

U.S. PATENT DOCUMENTS

2012/0319522 A1* 12/2012 Ikeda .................. H02K 3/32
                                                                310/201
2016/0043605 A1*  2/2016 Mizutani ............. H02K 1/16
                                                                310/45
(Continued)

FOREIGN PATENT DOCUMENTS

JP          2013-150548 A       8/2013

OTHER PUBLICATIONS

International Search Report of PCT/JP2017/014345 dated Jul. 11, 2017.

*Primary Examiner* — Tulsidas C Patel
*Assistant Examiner* — Rashad H Johnson
(74) *Attorney, Agent, or Firm* — Sughrue Mion, PLLC; Richard C. Turner

(57) ABSTRACT

Provided is an excellent insulating rotating electric machine having a small axial size and a small number of components. In the rotating electric machine according to the present invention, radially outer-side terminals and radially inner-side terminals extend from slots while a circumferential bending direction is alternately changed for each group of n radially outer-side terminals or n radially inner-side terminals after the extension thereof from the slots. A first angle formed between at least one of an oblique-side portion of each of the n radially inner-side terminals, which are continuous in the circumferential direction of the stator core and are bent in the same circumferential bending direction, and an oblique-side portion of each of the n radially outer-side terminals, which are continuous in the circumferential direction and are bent the same circumferential bending direction,
(Continued)

and an end surface of a stator core monotonously decreases in the circumferential bending direction.

15 Claims, 27 Drawing Sheets

(51) Int. Cl.
*H02K 1/16* (2006.01)
*H02K 3/14* (2006.01)
*H02K 3/34* (2006.01)
*H02K 3/50* (2006.01)
*H02K 3/52* (2006.01)

(52) U.S. Cl.
CPC ............... *H02K 11/25* (2016.01); *H02K 3/50* (2013.01); *H02K 3/52* (2013.01); *H02K 3/525* (2013.01)

(58) Field of Classification Search
CPC ............ H02K 3/34; H02K 3/345; H02K 3/38; H02K 3/50; H02K 3/52; H02K 3/525; H02K 11/25
USPC ............................... 310/40 R, 68 C, 208, 219
See application file for complete search history.

(56) References Cited

U.S. PATENT DOCUMENTS

| | | | |
|---|---|---|---|
| 2016/0156238 A1* | 6/2016 | Tsuiki | H02K 3/28 310/71 |
| 2020/0126694 A1* | 4/2020 | Kaneko | H01B 3/30 |
| 2020/0127518 A1* | 4/2020 | Azusawa | H02K 3/34 |

* cited by examiner

FIRST CIRCUMFERENTIAL
DIRECTION

SECOND CIRCUMFERENTIAL
DIRECTION

FIRST CIRCUMFERENTIAL
DIRECTION

FIRST CIRCUMFERENTIAL
DIRECTION
→

FIRST CIRCUMFERENTIAL
DIRECTION
→

SECOND CIRCUMFERENTIAL
DIRECTION
←

FIRST CIRCUMFERENTIAL
DIRECTION
⎯⎯⎯⎯⎯⎯→

SECOND CIRCUMFERENTIAL
DIRECTION
←⎯⎯⎯⎯⎯⎯

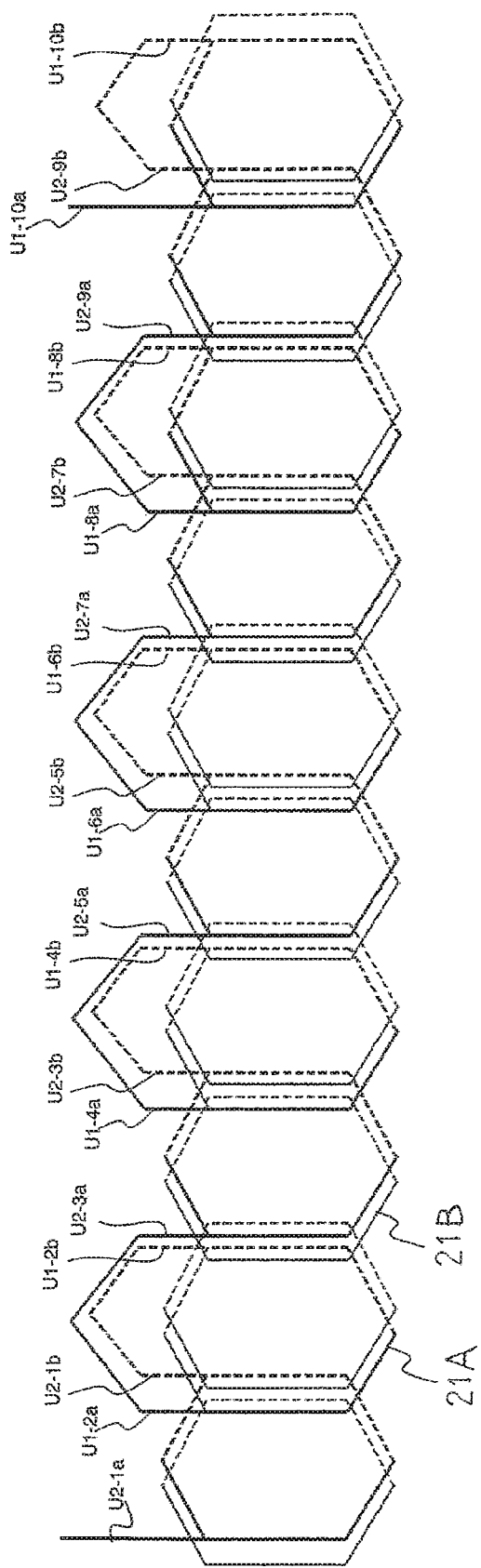

FIRST CIRCUMFERENTIAL
DIRECTION

SECOND CIRCUMFERENTIAL
DIRECTION

FIRST CIRCUMFERENTIAL
DIRECTION

ROTATING ELECTRIC MACHINE HAVING TERMINALS BENT TO FORM JOINED PORTIONS

CROSS REFERENCE TO RELATED APPLICATIONS

This application is a National Stage of International Application No. PCT/JP2017/014345 filed Apr. 6, 2017.

TECHNICAL FIELD

The present invention relates to a rotating electric machine, for example, an electric motor or a power generator, and more particularly, to a structure of a stator winding.

BACKGROUND ART

In recent years, for a rotating electric machine such as an electric motor or a power generator, a small size with a high output and high quality are demanded. Further, in order to achieve a higher output, there has been used a stator of a distributed winding type. In the stator of a distributed winding type, thick conductor wires are used to cause a large current to flow through a stator winding, and the conductor wires are arranged in slots.

However, when the winding of the distributed winding type formed of the thick conductor wires is used, there arise problems in that, as compared to a case in which a winding of a concentrated winding type is used, an axial length of the stator becomes longer, and the number of components increases.

In view of the circumstances described above, in a related-art rotating electric machine described in Patent Literature 1, a terminal wire extending from a radially innermost position is connected to a terminal wire being a target to be connected, which extends from a radially outermost position, across a coil end. A connected portion thereof is bent so as to be brought closer to the coil end to project radially outward. In this manner, the axial length of the stator is shortened, and the number of components is reduced.

CITATION LIST

Patent Literature

[PTL 1] JP 2013-150548 A

SUMMARY OF INVENTION

Technical Problem

In Patent Literature 1, it is difficult to define a sufficient distance between terminal wires adjacent to each other, and hence there arises a problem in that quality in terms of an insulating property is lowered.

The present invention has been made to solve the problems described above, and has an object to provide a rotating electric machine, which has a small size with a small number of components and high quality in terms of an insulating property.

Solution to Problem

According to one embodiment of the present invention, there is provided a rotating electric machine, including a stator including: a stator core having an annular shape, which includes slots arranged in a circumferential direction of the stator core; and a stator winding mounted to the stator core. The stator winding includes a plurality of winding bodies formed by distributed winding, each being formed by winding a conductor wire a plurality of turns, which are inserted into a plurality of the slots to be mounted to the stator core. Each of the winding bodies includes a radially inner-side terminal extending from a radially innermost position in a corresponding one of the slots to one axial side of the stator core and a radially outer-side terminal extending from a radially outermost position in a corresponding one of the slots to the one axial side of the stator core. Each of the radially inner-side terminals for forming each of phase windings of the stator winding among the radially inner-side terminals extends from a radially innermost position in a corresponding one of the slots on a one-by-one basis while a circumferential bending direction after the extension of the radially inner-side terminal from the corresponding slot is changed alternately for each group of n radially inner-side terminals (in which n is a natural number equal to or larger than 2). Each of the radially outer-side terminals for forming each of the phase windings of the stator winding among the radially outer-side terminals extends from a radially outermost position in a corresponding one of the slots on a one-by-one basis while a circumferential bending direction after the extension of the radially outer-side terminal from the corresponding slot is changed alternately for a group of n radially outer-side terminals. Each of the phase windings is formed by directly joining distal end portions of the radially inner-side terminals respectively extending from the slots being separate from each other by n slots to be bent so as to be brought closer to each other and directly joining distal end portions of the radially outer-side terminals respectively extending from the slots being separate from each other by n slots to be bent so as to be brought closer to each other. A first angle formed between at least one of an oblique-side portion of each of the n radially inner-side terminals, which are continuous in the circumferential direction and are bent in the same circumferential bending direction, and an oblique-side portion of each of the n radially outer-side terminals, which are continuous in the circumferential direction and are bent in the circumferential bending direction, and an end surface of the stator core monotonously decreases in the circumferential bending direction.

Advantageous Effects of Invention

According to one embodiment of the present invention, the phase winding is formed by directly joining the distal end portions of the radially inner-side terminals, which extend from the slots being separate from each other by the n slots and are bent so as to be brought closer to each other, and directly joining the distal end portions of the radially outer-side terminals respectively extending from the slots being separate from each other by the n slots to be bent so as to be brought closer to each other. In this manner, the radially inner-side terminals and the radially outer-side terminals are not required to be caused to pass on an axially outer side of a coil end group, thereby being capable of reducing an axial dimension of the stator. Further, another component such as a bus bar for connecting the terminals of the winding bodies is not required, thereby being capable of reducing the number of components of the stator.

Further, the first angle formed between at least one of the oblique-side portion of each of the n radially inner-side terminals, which are continuous in the circumferential direction and are bent in the same circumferential bending direction, and the oblique-side portion of each of the n radially outer-side terminals, which are continuous in the circumferential direction and are bent in the same circumferential bending direction, and the end surface of the stator core monotonously decreases in the circumferential bending direction. Thus, a distance between the oblique-side portions adjacent to each other in the circumferential direction increases, thereby enhancing the insulating property.

BRIEF DESCRIPTION OF DRAWINGS

FIG. 25B is a view for illustrating wire connection of the stator winding in the rotating electric machine according to the fifth embodiment of the present invention.

DESCRIPTION OF EMBODIMENTS

Now, with reference to the drawings, a rotating electric machine according to exemplary embodiments of the present invention is described.

First Embodiment

Figure 1:
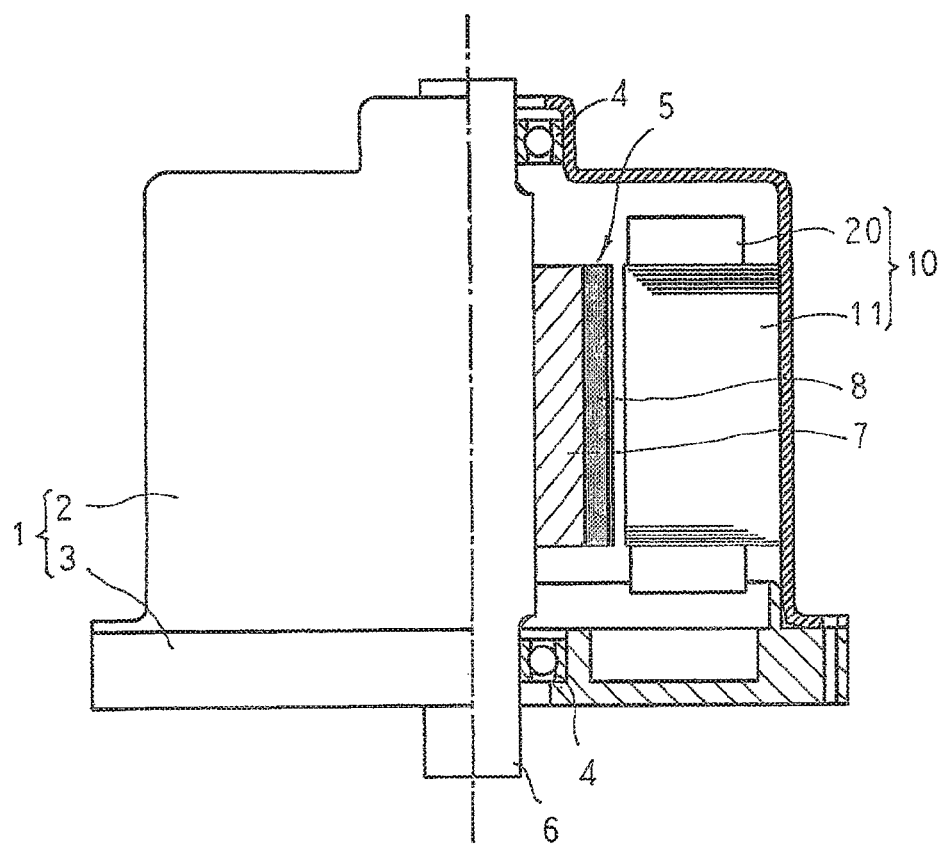
FIG. 1 is a half sectional view for illustrating a rotating electric machine according to a first embodiment of the present invention.
Figure 2:
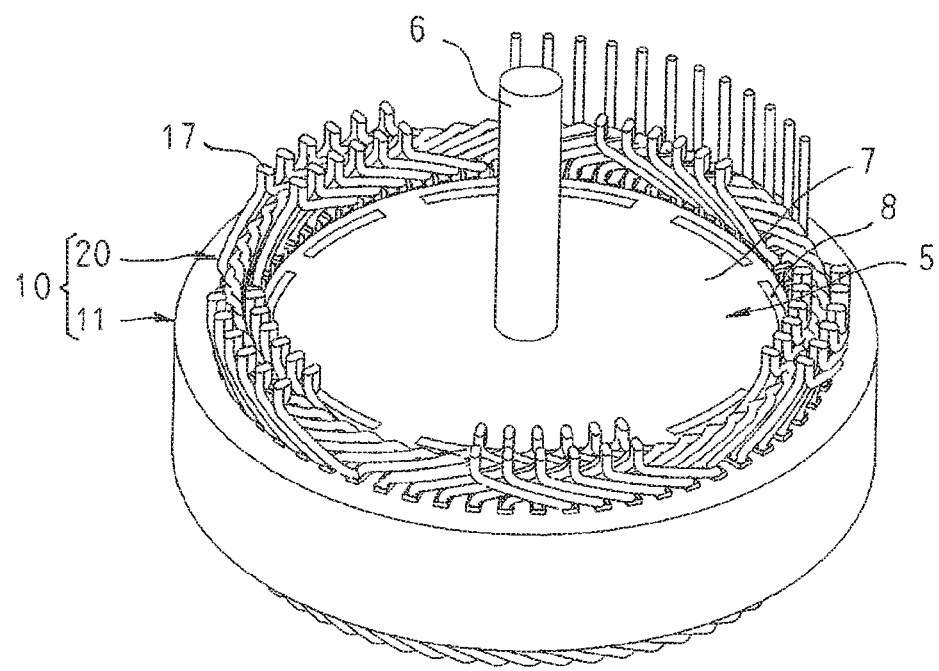
FIG. 2 is a perspective view for illustrating a main part of the rotating electric machine according to the first embodiment of the present invention.
Figure 3:
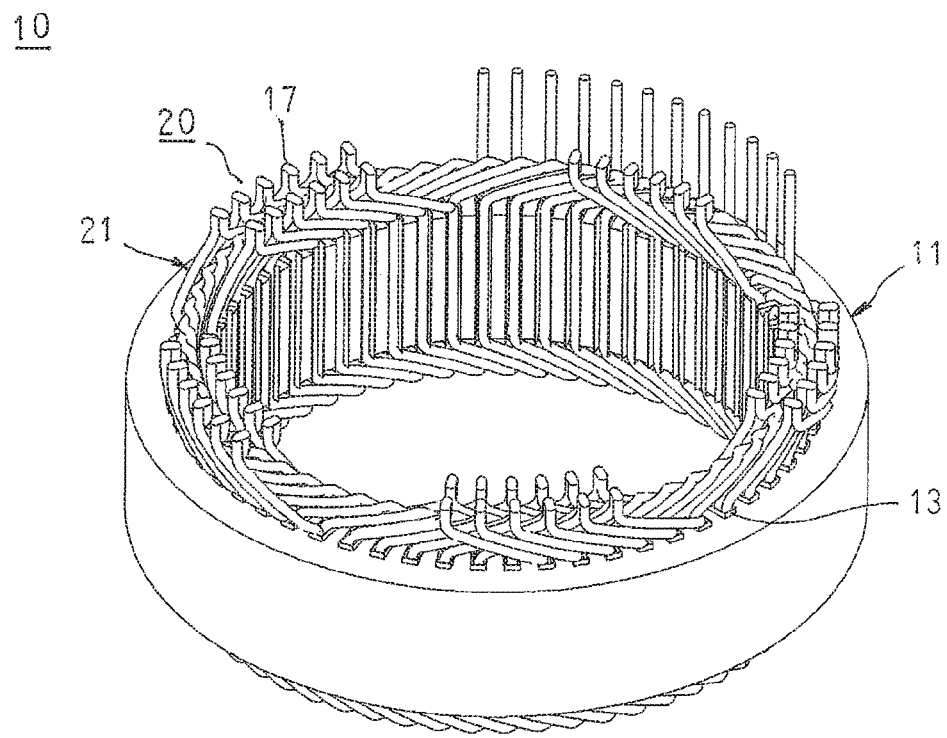
FIG. 3 is a perspective view for illustrating a stator to be applied to the rotating electric machine according to the first embodiment of the present invention.
Figure 4:
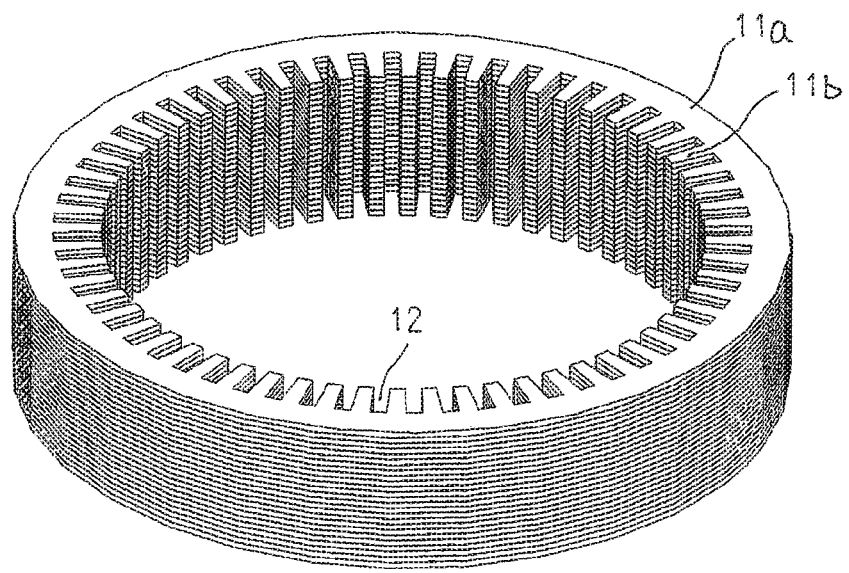
FIG. 4 is a perspective view for illustrating a stator core to be applied to the rotating electric machine according to the first embodiment of the present invention.
Figure 5:
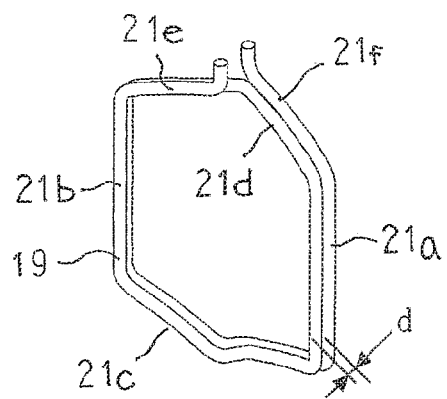
FIG. 5 is a perspective view for illustrating a first winding body for forming a stator winding of the stator to be applied to the rotating electric machine according to the first embodiment of the present invention.
Figure 6:
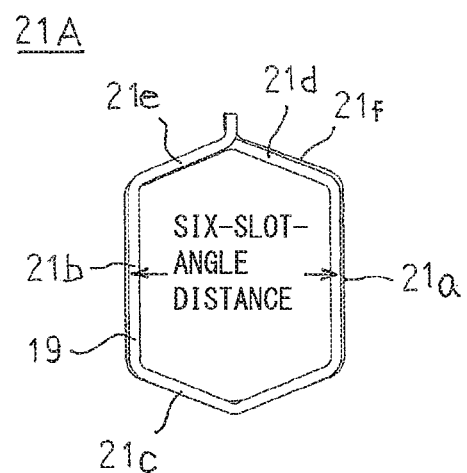
FIG. 6 is a front view for illustrating the first winding body for forming the stator winding of the stator in the rotating electric machine according to the first embodiment of the present invention.
Figure 7:
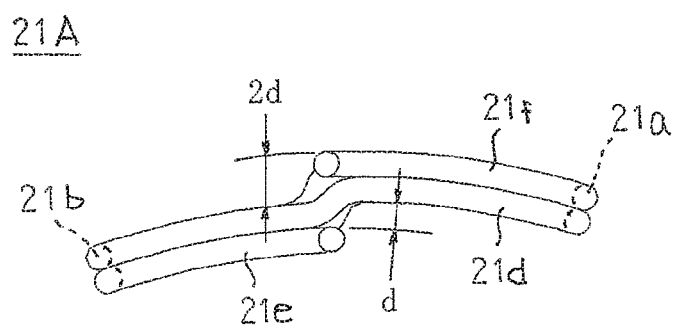
FIG. 7 is an end view for illustrating the first winding body for forming the stator winding of the stator in the rotating electric machine according to the first embodiment of the present invention.
Figure 8:
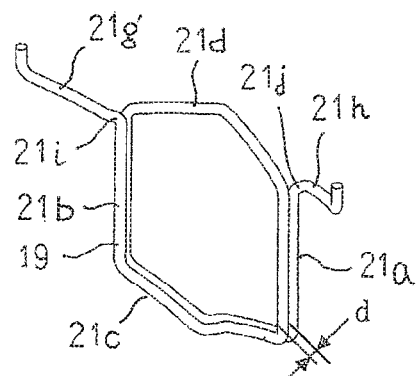
FIG. 8 is a perspective view for illustrating a second winding body for forming the stator winding of the stator to be applied to the rotating electric machine according to the first embodiment of the present invention.
Figure 9:
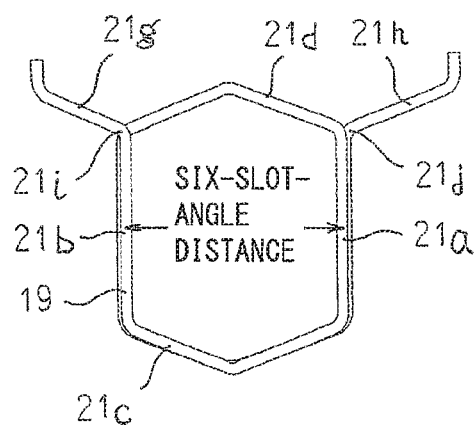
FIG. 9 is a front view for illustrating the second winding body for forming the stator winding of the stator in the rotating electric machine according to the first embodiment of the present invention.
Figure 10:
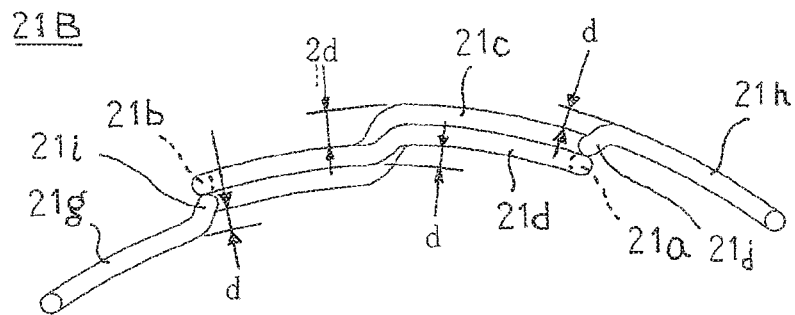
FIG. 10 is an end view for illustrating the second winding body for forming the stator winding of the stator in the rotating electric machine according to the first embodiment of the present invention.

FIG. 1 is a half sectional view for illustrating a rotating electric machine according to a first embodiment of the present invention. FIG. 2 is a perspective view for illustrating a main part of the rotating electric machine according to the first embodiment of the present invention. FIG. 3 is a perspective view for illustrating a stator to be applied to the rotating electric machine according to the first embodiment of the present invention. FIG. 4 is a perspective view for illustrating a stator core to be applied to the rotating electric machine according to the first embodiment of the present invention. FIG. 5 is a perspective view for illustrating a first winding body for forming a stator winding of the stator to be applied to the rotating electric machine according to the first embodiment of the present invention. FIG. 6 is a front view for illustrating the first winding body for forming the stator winding of the stator in the rotating electric machine according to the first embodiment of the present invention. FIG. 7 is an end view for illustrating the first winding body for forming the stator winding of the stator in the rotating electric machine according to the first embodiment of the present invention. FIG. 8 is a perspective view for illustrating a second winding body for forming the stator winding of the stator to be applied to the rotating electric machine according to the first embodiment of the present invention. FIG. 9 is a front view for illustrating the second winding body for forming the stator winding of the stator in the rotating electric machine according to the first embodiment of the present invention. FIG. 10 is an end view for illustrating the second winding body for forming the stator winding of the stator in the rotating electric machine according to the first embodiment of the present invention.

In FIG. 1 and FIG. 2, a rotating electric machine 100 includes a housing 1, a stator 10, and a rotor 5. The housing 1 includes a frame 2 and an end plate 3. The frame 2 has a bottomed cylindrical shape. The end plate 3 is configured to close an opening of the frame 2. The stator 10 is firmly fixed to a cylindrical portion of the frame 2 in an internally fitted state. The rotor 5 is firmly fixed to a rotary shaft 6 rotatably supported in a bottom of the frame 2 and the end plate 3 through intermediation of bearings 4, and is rotatably disposed on an inner peripheral side of the stator 10.

The rotor 5 is a permanent magnet rotor including a rotor core 7 and permanent magnets 8. The rotor core 7 is firmly fixed to the rotary shaft 6 inserted therethrough at an axial center position. The permanent magnets 8 are embedded in the stator core 7 on an outer peripheral surface side of the stator core 7 and are arranged at equal pitches in a circumferential direction of the rotor 5 to form magnetic poles. The rotor 5 is not limited to the permanent magnet rotor, and may be a squirrel-cage rotor in which an uninsulated rotor conductor is accommodated in slots of the rotor core and both sides thereof are short-circuited with use of a short-circuit ring or a winding rotor in which an insulated conductor wire is mounted to the slots of the rotor core.

Next, a configuration of the stator 10 is specifically described with reference to FIG. 3 to FIG. 10.

The stator 10 includes, as illustrated in FIG. 3, a stator core 11, a stator winding 20, and slot cells 13. The stator winding 20 is mounted to the stator core 11. The slot cells 13 are mounted to slots 12 of the stator core 11. The stator winding 20 is formed by connecting a plurality of winding bodies 21 mounted to the stator core 11. Each of the slot cells 13 is formed by bending, for example, a rectangular sheet formed of a polyimide film sandwiched between meta-aramid fibers into a U shape. The slot cells 13 are inserted into the slots 12 to electrically separate the stator core 11 and the stator winding 20 from each other.

Figure 20:
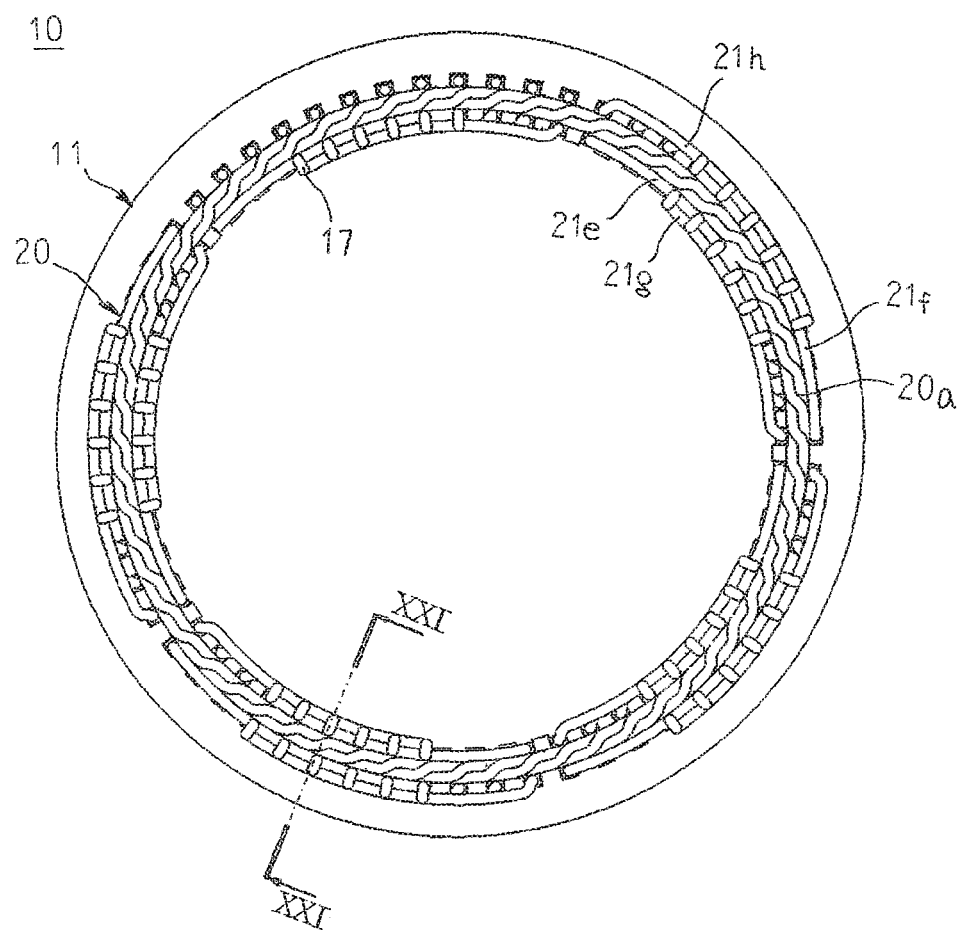
FIG. 20 is an end view for illustrating the stator in the rotating electric machine according to the first embodiment of the present invention.

For convenience of the description, a pole number p of the rotor 5 is set to 10, a slot number S of the stator core 11 is set to 60, and the stator winding 20 is set to a three-phase winding. Specifically, the slots 12 are formed in the stator core 11 in a proportion of two slots per phase for each pole. In FIG. 3, for clear illustration of a wire connection state of radially inner-side terminals and radially outer-side terminals, the radially inner-side terminals and the radially outer-side terminals are illustrated in an exaggerated manner as projecting axially outward from a coil end group. However, in reality, as illustrated in FIG. 20, the radially inner-side terminals and the radially outer-side terminals have an axial height equal to that of the coil end group.

The stator core 11 is formed by, as illustrated in FIG. 4, laminating and integrating thin electromagnetic steel sheets. The stator core 11 includes a core back 11a having an annular shape and a plurality of teeth 11b. The plurality of teeth 11b are arranged in a circumferential direction of the stator 10 so as to project radially inward from an inner peripheral wall surface of the core back 11a. Spaces surrounded by the core back 11a and the teeth 11b correspond to the slots 12. Each of the teeth 11b is formed into a tapered shape having a circumferential width gradually decreasing toward a radially inner side. A cross section of each of the slots 12, which is orthogonal to an axial center of the stator core 11, has a rectangular shape.

The winding bodies 21 for forming the stator core 20 include first winding bodies 21A and second winding bodies 21b. The first winding body 21A and the second winding body 21B have different directions in which terminals extend. Each of the first winding body 21A and the second winding body 21B is a hexagonal coil formed by helically winding a conductor wire 19 having a circular cross section with a diameter d two turns into an approximately hexagonal shape. The conductor wire 19 is formed of, for example, a copper wire or an aluminum wire, which is continuous without a connecting portion and is insulation-coated with an enamel resin. Specifically, each of the first winding body 21A and the second winding body 21B is a winding body formed by distributed winding and lap winding. Each of the winding bodies 21 may be formed of a conductor wire having a rectangular cross section in place of the conductor wire 19 having the circular cross section.

The first winding body 21A includes, as illustrated in FIG. 5 to FIG. 7, a first straight portion 21a, a second straight portion 21b, a first coil end 21c, a second coil end 21d, a radially inner-side terminal 21e, and a radially outer-side terminal 21f. The first straight portion 21a and the second straight portion 21b are arranged in two rows so as to be separate from each other by a six-slot-angle distance. In each of the row of the first straight portion 21a and the row of the second straight portion 21b, two conductor wires are arranged so as to be held in contact with each other in a radial direction. The first coil end 21c couples one longitudinal end of the first straight portion 21a and one longitudinal end of the second straight portion 21b to each other, and the second coil end 21d couples another longitudinal end of the first straight portion 21a and another longitudinal end of the second straight portion 21b to each other between the rows of the first straight portion 21a and the second straight portion 21b so as to alternate the rows. The "six-slot-angle distance" is a distance between slot centers of the slots 12 located on both sides of continuous six teeth 11b and corresponds to one magnetic-pole pitch. The "radial direction" corresponds to a radial direction of the stator core 11.

The first coil end 21c extends outward in a length direction of the first straight portion 21a and the second straight portion 21b from one end of the first straight portion 21a in one of the rows toward the second straight portion 21b in another one of the rows, is bent at the center between the row of the first straight portion 21a and the row of the second straight portion 21b to be displaced radially inward by 2d, and is then bent to extend inward in the length direction of the first straight portion 21a and the second straight portion 21b toward the second straight portion 21b in the another one of the rows to be connected to one end of the second straight portion 21b in the another one of the rows.

Similarly, the second coil end 21d extends outward in a length direction of the first straight portion 21a and the second straight portion 21b from another end of the second straight portion 21b in another one of the rows toward the first straight portion 21a in another one of the rows, is bent at the center between the row of the first straight portion 21a and the row of the second straight portion 21b to be displaced radially outward by d, and is then bent to extend inward in the length direction of the first straight portion 21a and the second straight portion 21b toward the first straight portion 21a in one of the rows to be connected to another end of the first straight portion 21a in one of the rows.

The radially inner-side terminal 21e extends from the another end of the second straight portion 21b, which is located on the radially inner side, toward the first straight portion 21a in the one row so as to be approximately parallel to the second coil end 21d, is bent at the approximate center between the row of the first straight portion 21a and the row of the second straight portion 21b to extend outward in the length direction of the first straight portion 21a and the second straight portion 21b. The radially-outer terminal 21f extends from the another end of the first straight portion 21a, which is located on the radially outer side, toward the second straight portion 21b in the another one of the rows so as to be approximately parallel to the second coil end 21d and is bent at the approximate center between the row of the first straight portion 21a and the row of the second straight portion 21b to extend outward in the length direction of the first straight portion 21a and the second straight portion 21b.

The first winding body 21a having the configuration described above is accommodated in a first layer and a second layer from the radially outer side in one slot 12, and the second straight portion 21b is accommodated in a third layer and a fourth layer from the radially outer side in the slot 12, which is separate from the one slot 12 by the six-slot-angle distance. The radially outer-side terminal 21f extends to a vicinity of top of the second coil end 21d while maintaining the same radial position as that of the first straight portion 21a accommodated in the first layer from the radially outer side in the one slot 12. The radially inner-side terminal 21e extends to the vicinity of the top of the second coil end 21d while maintaining the same radial position as that of the second straight portion 21b accommodated in the fourth layer from the radially outer side in the slot 12, which is separate from the one slot 12 by the six-slot-angle distance.

The second winding body 21B includes, as illustrated in FIG. 8 to FIG. 10, a first straight portion 21a, a second straight portion 21b, a first coil end 21c, a second coil end 21d, a radially inner-side terminal 21g, and a radially outer-side terminal 21h. The first straight portion 21a and the second straight portion 21b are arranged in two rows so as to be separate from each other by a six-slot-angle distance. In each of the row of the first straight portion 21a and the row of the second straight portion 21b, two conductor wires are arranged so as to be held in contact with each other in a radial direction. The first coil end 21c couples one longitudinal end of the first straight portion 21a and one longitudinal end of the second straight portion 21b to each other, and the second coil end 21d couples another longitudinal end of the first straight portion 21a and another longitudinal end of the second straight portion 21b to each other between the rows of the first straight portion 21a and the second straight portion 21b so as to alternate the rows.

The first coil end 21c extends outward in a length direction of the first straight portion 21a and the second straight portion 21b from one end of the first straight portion 21a in one of the rows toward the second straight portion 21b in another one of the rows, is bent at the center between the row of the first straight portion 21a and the row of the second straight portion 21b to be displaced radially inward by 2d, and is then bent to extend inward in the length direction of the first straight portion 21a and the second straight portion 21b toward the second straight portion 21b in the another one of the rows to be connected to one end of the second straight portion 21b in the another one of the rows.

Similarly, the second coil end 21d extends outward in a length direction of the first straight portion 21a and the second straight portion 21b from another end of the second straight portion 21b in another one of the rows toward the first straight portion 21a in one of the rows, is bent at the center between the row of the first straight portion 21a and the row of the second straight portion 21b to be displaced radially outward by d, and is then bent to extend inward in the length direction of the first straight portion 21a and the second straight portion 21b toward the first straight portion 21a in the one of the rows to be connected to another end of the first straight portion 21a in the one of the rows.

After the radially inner-side terminal 21g is bent at a displacement portion 21i extending from the another end of the second straight portion 21b located on the radially inner side to be displaced radially inward by d, the radially inner-side terminal 21g extends approximately in parallel to a portion of the second coil end 21d, which extends from the another end of the first straight portion 21a to the center between the row of the first straight portion 21a and the row of the second straight portion 21b. After that, the radially inner-side terminal 21g is bent to extend outward in the length direction of the first straight portion 21a and the second straight portion 21b. After the radially outer-side terminal 21h is bent at a displacement portion 21j extending from the another end of the first straight portion 21a located on the radially outer side to be displaced radially outward by d, the radially outer-side terminal 21h extends approximately in parallel to a portion of the second coil end 21d, which extends from the another end of the second straight portion 21b to the center between the row of the first straight portion 21a and the row of the second straight portion 21b. After that, the radially outer-side terminal 21h is bent to extend outward in the length direction of the first straight portion 21a and the second straight portion 21b.

In the second winding body 21B having the configuration described above, the first straight portion 21a is accommodated in a first layer and a second layer from the radially outer side in one slot 12, and the second straight portion 21b is accommodated in a third layer and a fourth layer from the radially outer side in the slot 12, which is separate from the one slot 12 by the six-slot-angle distance. After the radially outer-side terminal 21h is displaced radially outward by d at the displacement portion 21j with respect to the first straight portion 21a accommodated in the first layer from the radially outer side in the one slot 12, the radially outer-side terminal 21h extends outward in a circumferential direction of the second winding body 21B. After the radially inner-side terminal 21g is displaced radially inward by d at the displacement portion 21i with respect to the second straight portion 21b accommodated in the fourth layer from the radially outer side in the slot 12, which is separate from the one slot by the six-slot angle distance, the radially inner-side terminal 21g extends outward in the circumferential direction of the second winding body 21B.

Figure 11:
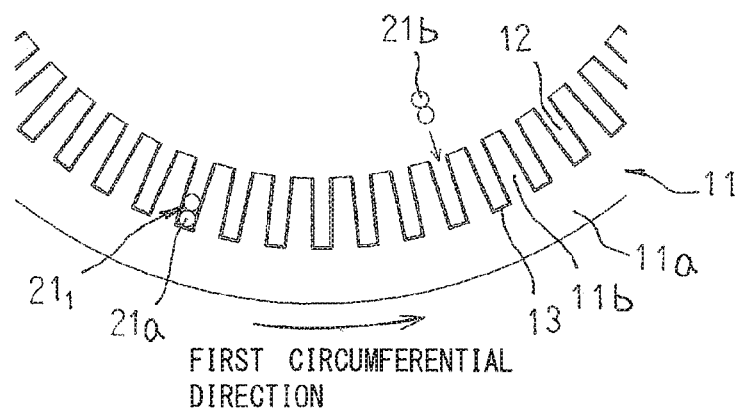
FIG. 11 is an end view of a main part, for illustrating a method of mounting the winding body, which is the first one to be mounted, to the stator core in the rotating electric machine according to the first embodiment of the present invention.
Figure 12:
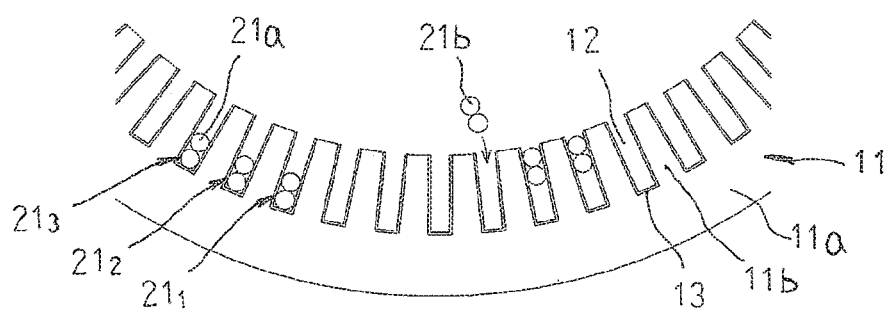
FIG. 12 is an end view of the main part, for illustrating a method of mounting the winding body, which is the third one to be mounted, to the stator core in the rotating electric machine according to the first embodiment of the present invention.
Figure 13:
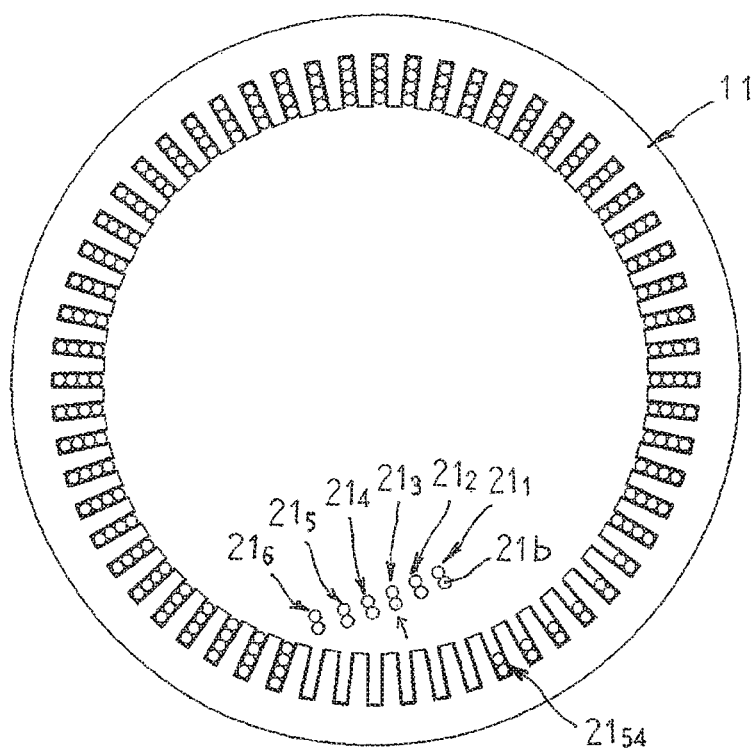
FIG. 13 is an end view for illustrating a method of mounting last six winding bodies to the stator core in the rotating electric machine according to the first embodiment of the present invention.
Figure 14:
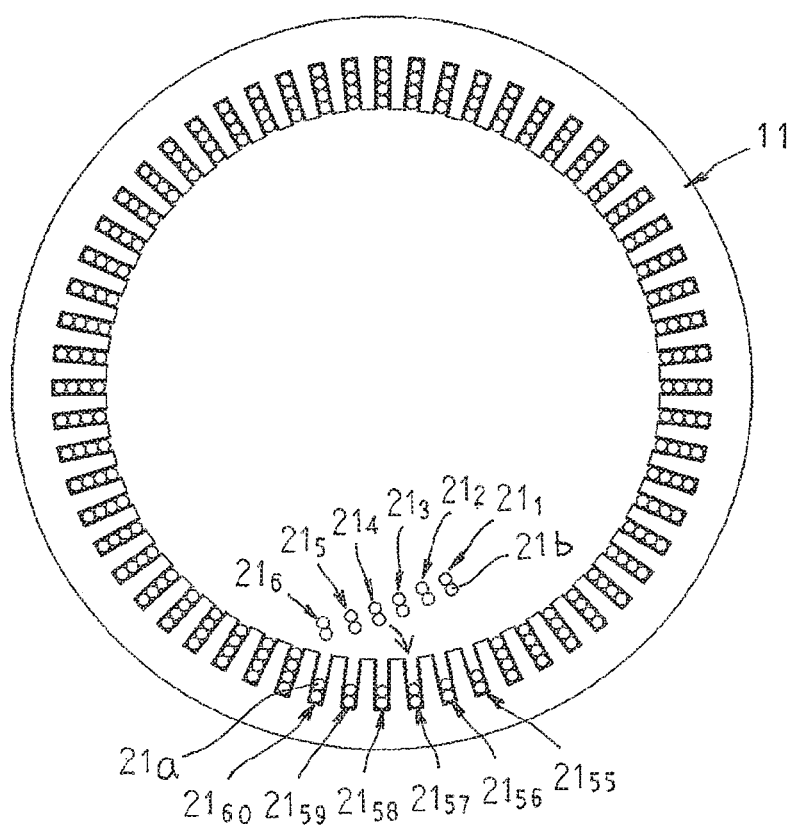
FIG. 14 is an end view for illustrating the method of mounting the last six winding bodies to the stator core in the rotating electric machine according to the first embodiment of the present invention.
Figure 15:
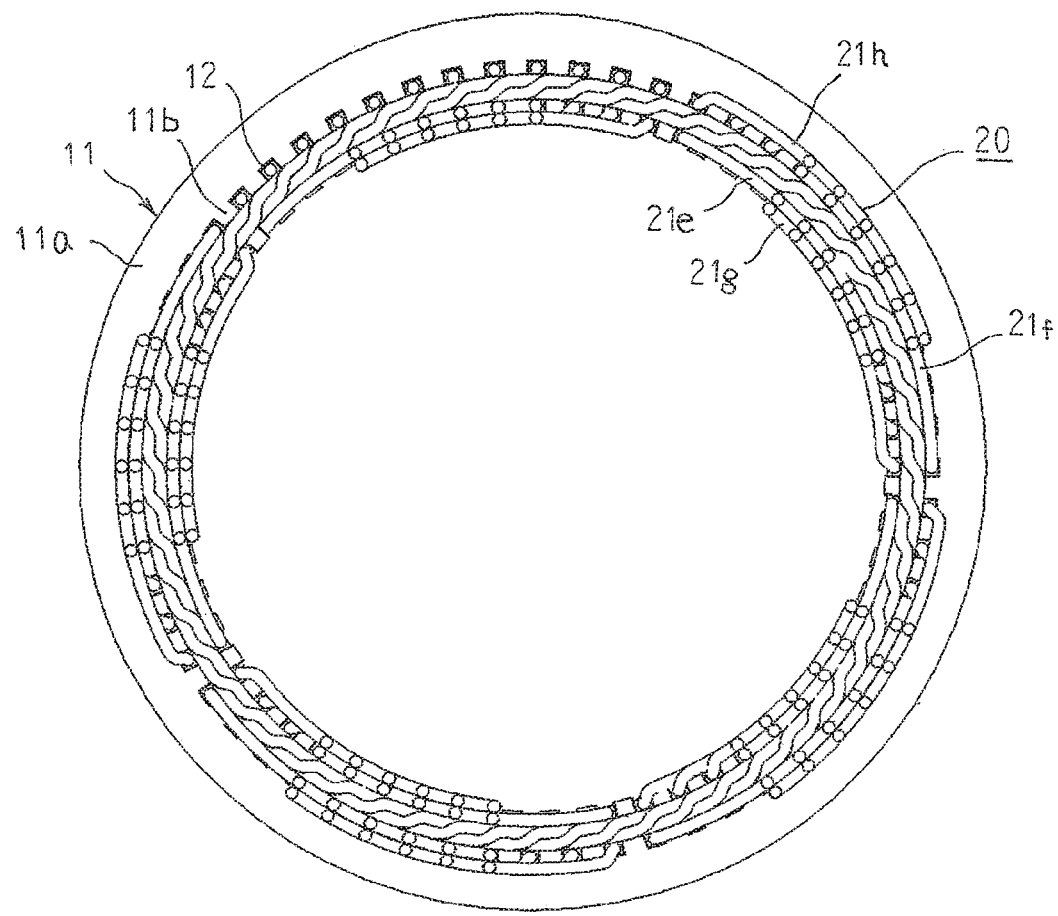
FIG. 15 is an end view for illustrating the stator core to which the winding bodies are mounted in the rotating electric machine according to the first embodiment of the present invention.
Figure 16:
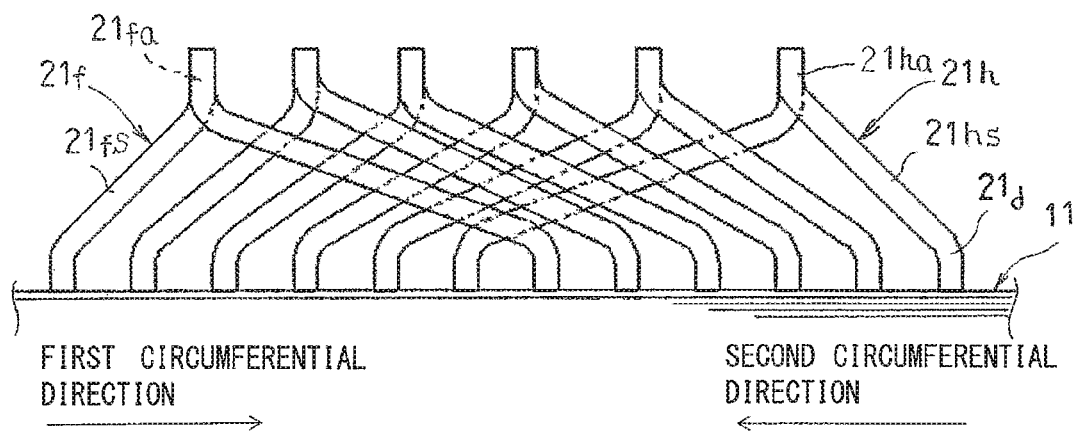
FIG. 16 is a side view of a main part, for illustrating the stator in the rotating electric machine according to the first embodiment of the present invention when viewed from a radially outer side.
Figure 17:
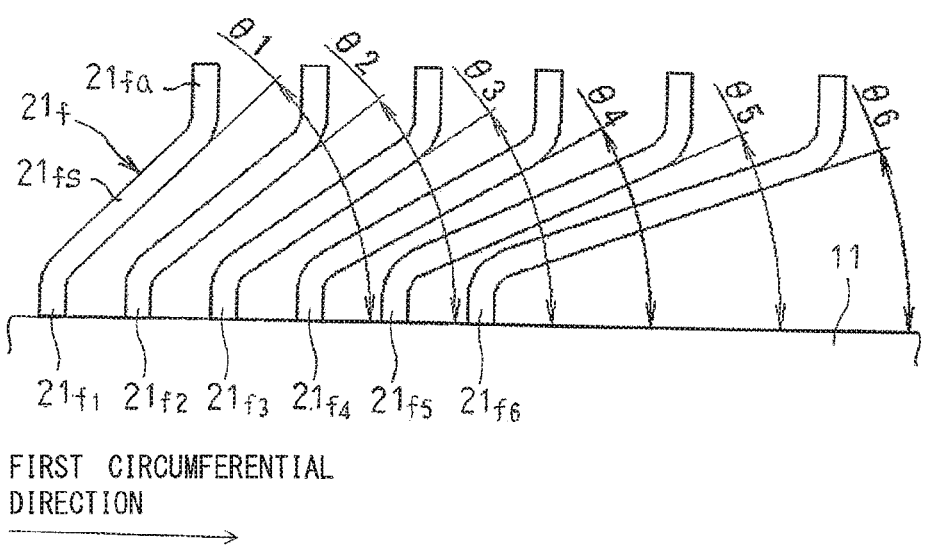
FIG. 17 is a view for illustrating bending shapes of radially outer-side terminals of the stator winding in the rotating electric machine according to the first embodiment of the present invention.

Next, a method of mounting the first winding bodies 21A and the second winding bodies 21B to the stator core 11 is described with reference to FIG. 11 to FIG. 15. FIG. 11 is an end view of a main part, for illustrating a method of mounting the winding body, which is the first one to be mounted, to the stator core in the rotating electric machine according to the first embodiment of the present invention. FIG. 12 is an end view of a main part, for illustrating a method of mounting the winding body, which is the third one to be mounted, to the stator core in the rotating electric machine according to the first embodiment of the present invention. FIG. 13 is an end view for illustrating a method of mounting last six mounting bodies to the stator core in the rotating electric machine according to the first embodiment of the present invention. FIG. 14 is an end view for illustrating the method of mounting the last six winding bodies to the stator core in the rotating electric machine according to the first embodiment of the present invention. FIG. 15 is an end view for illustrating the stator core to which the winding bodies are mounted in the rotating electric machine according to the first embodiment of the present invention. FIG. 16 is a side view of a main part, for illustrating the stator in the rotating electric machine according to the first embodiment of the present invention when viewed from the radially outer side. FIG. 17 is a view for illustrating bending shapes of the radially outer-side terminals of the stator winding in the rotating electric machine according to the first embodiment of the present invention. In FIG. 11 to FIG. 14, the winding bodies are representatively illustrated as the first straight portions and the second straight portions. In FIG. 16 and FIG. 17, only the radially outer-side terminals are illustrated.

First, the winding body 21 is formed by helically winding the conductor wire 19 two turns. For convenience of the description, the winding bodies 21 are denoted as a winding body $21_1$, a winding body $21_2$, a winding body $21_3$ ... a winding body $21_{59}$, and a winding body $21_{60}$ in the order of assembly.

Then, as illustrated in FIG. 11, the first winding body $21_1$ is inserted into a pair of the slots 12 of the stator core 11, which are separate from each other by the six-slot-angle distance, from the radially inner side. Similarly, the second winding body $21_2$ is inserted into a pair of the slots 12, which are shifted by one slot pitch to one side in a circumferential direction (hereinafter referred to as "first circumferential direction"), from the radially inner side. Subsequently, as illustrated in FIG. 12, the third winding body $21_3$ is inserted into a pair of the slots 12, which are shifted by one slot pitch in the first circumferential direction, from the radially inner side. The above-mentioned procedure is repeated so as to complete mounting of the winding bodies up to a fifty-fourth winding body $21_{54}$ to the stator core 11.

Subsequently, as illustrated in FIG. 13, the second straight portions 21b of the first to sixth winding bodies 21 (from the first winding body $21_1$ to the sixth winding body $21_6$), which are each accommodated in the third layer and the fourth layer from the radially outer side in the slot 12, are drawn out radially inward from the slots 12. Subsequently, in a similar manner, a fifty-fifth winding body $21_{55}$, a fifty-sixth winding body $21_{56}$, a fifth-seventh winding body $21_{57}$ ... and a sixtieth winding body $21_{60}$ are mounted one by one into the stator core 11 in the stated order. Then, as illustrated in FIG. 14, the second straight portions 21b of the first to sixth winding bodies (from the first winding body $21_1$ to the sixth winding body $21_6$) are inserted to the third layer and the fourth layer in the slots 12 from the radially outer side to thereby complete the mounting of the sixty winding bodies 21 to the stator core 11.

The first winding bodies 21A are used for first to sixth, thirteenth to eighteenth, twenty-fifth to thirtieth, thirty-seventh to forty-second, and fourth-ninth to fifty-fourth windings 21, and the second winding bodies 21B are used for seventh to twelfth, nineteenth to twenty-fourth, thirty-first to thirty-sixth, forty-third to forty-eighth, and fifty-fifth to sixtieth winding bodies 21.

As described above, sets of six first winding bodies 21A and sets of six second winding bodies 21B are alternately mounted to the stator core 11. The radially inner-side terminal 21e of each of the first winding bodies 21A maintains a fourth radial position from the radially outer side in the slot 12, whereas the radially outer-side terminal 21f maintains a first radial position from the radially outer side in the slot 12. Further, the radially inner-side terminal 21g of each of the second winding bodies 21B is displaced radially inward from the fourth radial position from the radially outer side in the slot 12 by the width d of the conductor 19, whereas the radially outer-side terminal 21h is displaced radially outward from the first radial position from the radially outer side in the slot 12 by the width d of the conductor 19.

In the manner described above, the radially inner-side terminals 21e and 21g project toward a radially inner side of a coil end group 20a, whereas the radially outer-side terminals 21f and 21h project toward a radially outer side of the coil end group 20a. As illustrated in FIG. 15, each terminal pair includes the first winding body 21A and the second winding body 21B, which are separate from each other by 180 degrees in electrical angle so that a distal end portion of the radially inner-side terminal 21e of the first winding body 21A and a distal end portion of the radially inner-side terminal 21g of the second winding body 21B are held in contact with each other in the radial direction. Six terminal pairs described above are arranged in the circumferential direction as one set. Five sets described above are arranged so as to be separate from each other in the circumferential direction. Further, each terminal pair includes the first winding body 21A and the second winding body 21B, which are separate from each other by 180 degrees in electrical angle so that a distal end portion of the radially outer-side terminal 21f of the first winding body 21A and a distal end portion of the radially outer-side terminal 21h of the second winding body 21B are held in contact with each other in the radial direction. Six terminal pairs described above are arranged in the circumferential direction as one set. Four sets described above are arranged so as to be separate from each other in the circumferential direction. Twelve radially-outer side terminals 21f and 21h are arranged between the sets of terminal pairs at one-slot pitches.

In the set of six terminal pairs arranged in the circumferential direction, in which the distal end portions of the radially outer-side terminals 21f of the first winding bodies 21A and the distal end portions of the radially outer-side terminals 21h of the second winding bodies 21B, which are separate from each other by 180 degrees in electrical angle, are arranged so as to be held in contact with each other in the radial direction, as illustrated in FIG. 16, an oblique-side portion 21fs of each of the radially outer-side terminals 21f and an oblique-side portion 21hs of a corresponding one of the radially outer-side terminals 21h cross each other when viewed from the radially outer side. Specifically, the oblique-side portions 21fs of the radially outer-side terminals 21f of the first winding bodies 21A, which extend from the slots, are bent in the first circumferential direction. Meanwhile, the oblique-side portions 21hs of the radially outer-side terminals 21h of the second winding bodies 21B, which extend from the slots, are bent in a second circumferential direction, which is a direction opposite to the first circumferential direction.

More specifically, as illustrated in FIG. 17, when six radially outer-side terminals 21f are denoted for convenience as a radially outer-side terminal $21f_1$, a radially outer-side terminal $21f_2$, a radially outer-side terminal $21f_3$ . . . , and a radially outer-side terminal $21f_6$ in the order of arrangement in the first circumferential direction, first angles $\theta1$, $\theta2$, $\theta3$ . . . , and $\theta6$, each being formed between a surface of the oblique-side portion 21fs of the radially outer-side terminal $21f_1$, $21f_2$, $21f_3$ . . . $21f_6$, which is oriented forward in the first circumferential direction, and an end surface of the stator core 11 have a relationship of: $\theta1>\theta2>\theta3$ . . . $>\theta6$. Specifically, the first angle $\theta$ gradually decreases in the first circumferential direction, which is a bending direction of the oblique-side portions 21fs of the radially outer-side terminals 21f.

Meanwhile, when six radially outer-side terminals 21h are denoted for convenience as a radially outer-side terminal $21h_1$, a radially outer-side terminal $21h_2$, a radially outer-side terminal $21h_3$ . . . , and a radially outer-side terminal $21h_6$ in the order of arrangement in the first circumferential direction, the first angle $\theta$ formed between a surface of the oblique-side portion 21hs of the radially outer-side terminal $21h_1$, $21h_2$, $21h_3$ . . . $21h_6$, which is oriented forward in the second circumferential direction, and the end surface of the stator core 11 gradually decreases in the second circumferential direction, which is a bending direction of the oblique-side portions 21hs of the radially outer-side terminals 21h.

A distal end portion 21fa of the radially outer-side terminal 21f and a distal end portion 21ha of the radially outer-side terminal 21h, which are held in contact with each other in the radial direction, are located at the same height position from the end surface of the stator core 11.

Although not illustrated, even in the sets, each including six terminal pairs arranged in the circumferential direction so that the distal end portion of the radially inner-side terminal 21e of the first winding body 21A and the distal end portion of the radially inner-side terminal 21g of the second winding body 21B of each terminal pair, which are separate from each other by 180 degrees in electrical angle, are held in contact with each other in the radial direction, an oblique-side portion of each of the radially inner-side terminals 21e and an oblique-side portion of a corresponding one of the radially inner-side terminals 21g cross each other when viewed from the radially inner side.

Meanwhile, when six radially inner-side terminals 21e are denoted for convenience as a radially inner-side terminal $21e_1$, a radially inner-side terminal $21e_2$, a radially inner-side terminal $21e_3$ . . . , and a radially inner-side terminal $21e_6$ in the order of arrangement in the second circumferential direction, the first angle $\theta$ formed between a surface of the oblique-side portion of the radially inner-side terminal $21e_1$, $21e_2$, $21e_3$ . . . $21e_6$, which is oriented forward in the second circumferential direction, and the end surface of the stator core 11 gradually decreases in the second circumferential direction, which is a bending direction of the oblique-side portions of the radially inner-side terminals 21e. Further, when six radially inner-side terminals 21g are denoted for convenience as a radially inner-side terminal $21g_1$, a radially inner-side terminal $21g_2$, a radially inner-side terminal 21g3 . . . , and a radially inner-side terminal $21g_6$ in the order of arrangement in the first circumferential direction, the first angle $\theta$ formed between a surface of the oblique-side portion 21gs of the radially inner-side terminal $21gg_1$, $21g_2$, $21g_3$ . . . $21g_6$, which is oriented forward in the first circumferential direction, and the end surface of the stator core 11 gradually decreases in the first circumferential direction, which is a bending direction of the oblique-side portions of the radially outer-side terminals 21g. A distal end portion of the radially inner-side terminal 21e and a distal end portion of the radially inner-side terminal 21g, which are held in contact with each other in the radial direction, are located at the same height position from the end surface of the stator core 11.

Figure 18:
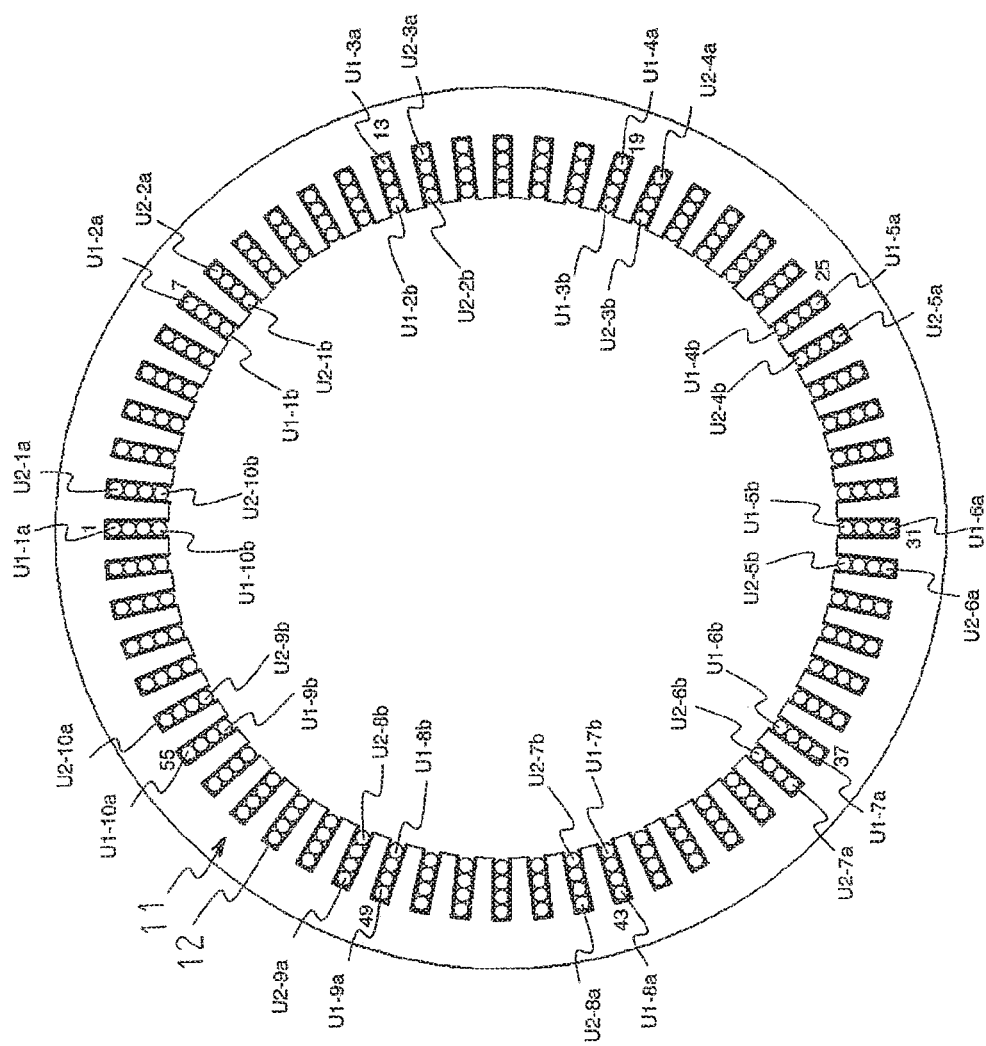
FIG. 18 is an end view of the stator in the rotating electric machine according to the first embodiment of the present invention when viewed from an axial direction of the stator.
Figure 19A:
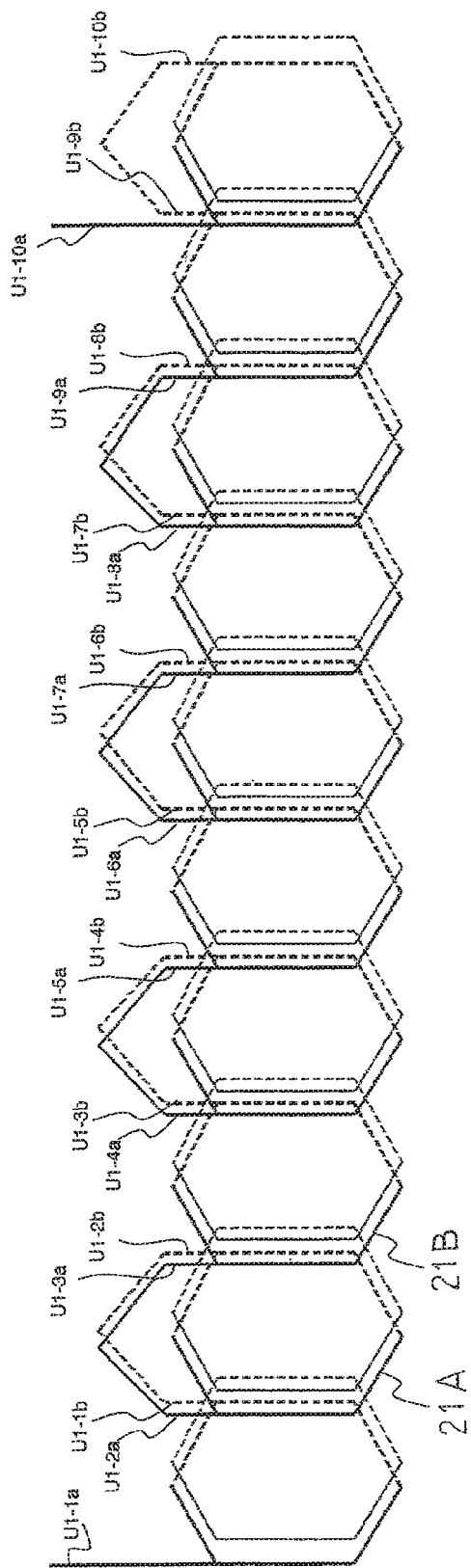
FIG. 19A is a view for illustrating wire connection of the stator winding in the rotating electric machine according to the first embodiment of the present invention.
Figure 19B:
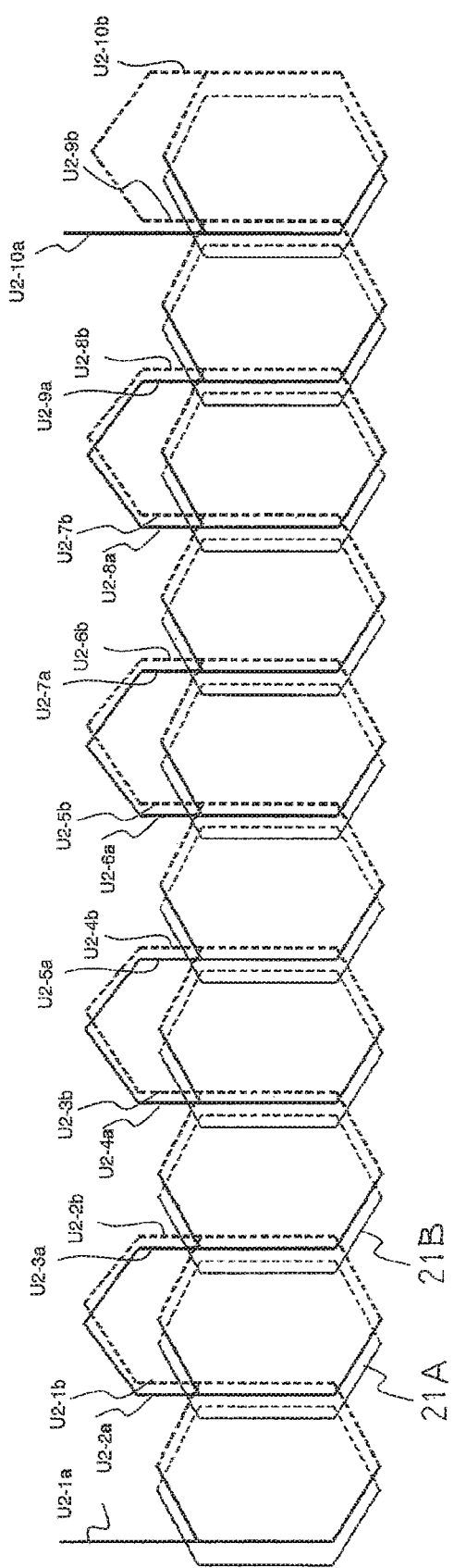
FIG. 19B is a view for illustrating wire connection of the stator winding in the rotating electric machine according to the first embodiment of the present invention.

Next, a wire connection method for the stator winding 20 is described with reference to FIG. 18, FIG. 19A, and FIG. 19B. FIG. 18 is an end view of the stator in the rotating electric machine according to the first embodiment of the present invention when viewed from the axial direction. FIG. 19A is a view for illustrating wire connection of a U1-phase winding of the stator winding in the rotating electric machine according to the first embodiment of the present invention. FIG. 19B is a view for illustrating wire connection of a U2-phase winding of the stator winding in the rotating electric machine according to the first embodiment of the present invention. In FIG. 18, the winding bodies 21 are representatively illustrated as the first straight portions and the second straight portions.

In FIG. 18, slot numbers 1, 7, 13 . . . 49, and 55 are sequentially allocated to the slots 12 in the circumferential direction. Numbers U1-1a, U-2a . . . , and U1-10a and U1-1b, U1-2b . . . , and U1-10b denote the first straight portions 21a, which are continuous with the radially outer-side terminals 21f and 21h of the winding bodies 21 that form the U1-phase winding mounted to a group of the slots 12 with the slot numbers (1+6n) (in which n is a natural number including 0). Numbers U2-1a, U2-2a . . . , and U2-10a and U2-1b, U2-2b . . . , and U2-10b denote the second straight portions 21b, which are continuous with the radially inner-side terminals 21e and 21g of the winding bodies 21 that form the U2-phase winding mounted to a group of the slots 12 with the slot numbers (2+6n).

The winding bodies 21 are mounted to a group of slots with slot numbers (3+6n) to form a V1-phase winding. The winding bodies 21 are mounted to a group of slots with slot numbers (4+6n) to form a V2-phase winding. The winding bodies 21 are mounted to a group of slots with slot numbers (5+6n) to form a W1-phase winding. The winding bodies 21 are mounted to a group of slots with slot numbers (6+6n) to form a W2-phase winding. The wire connection is performed in the same manner for the U-phase winding, the V-phase winding, and the W-phase winding. Thus, the wire connection method is described only for the U-phase winding.

First, as illustrated in FIG. 19A, connection between U1-1b and U1-2b, U1-2a and U1-3a, U1-3b and U1-4b, U1-4a and U1-5a, U1-5b and U1-6b, U1-6a and U1-7a, U1-7b and U1-8b, U1-8a and U1-9a, and U1-9b and U1-10b, which are separate from each other in each set by one magnetic-pole pitch in the circumferential direction, is performed by, for example, welding to form the U1-phase winding. The connection between U1-1b and U1-2b corresponds to connection between the radially outer-side terminal 21f extending from the first straight portion 21a denoted by U1-1b and the radially outer-side terminal 21h extending from the first straight portion 21a denoted by U1-2b to each other.

Next, as illustrated in FIG. 19B, connection between U2-1b and U2-2b, U2-2a and U2-3a, U2-3b and U2-4b, U2-4a and U2-5a, U2-5b and U2-6b, U2-6a and U2-7a, U2-7b and U2-8b, U2-8a and U2-9a, and U2-9b and U2-10b, which are separate from each other in each set by one magnetic-pole pitch in the circumferential direction, is performed by, for example, welding to form the U2-phase winding. Subsequently, U1-10a and U2-1a are connected by, for example, welding to connect the U1-phase winding and the U2-phase winding in series. As a result, the U-phase winding having U1-1a as a feeding terminal and U2-10a as a neutral point is formed.

The V-phase winding and the W-phase winding are formed in a similar manner. The neutral points are wire-connected to obtain the stator winding 20 formed as a three-phase AC winding in which the U-phase winding, the V-phase winding, and the W-phase winding are wire-connected in a Y-connection configuration.

A wire connection state of the stator winding 20 of the stator 10, which is formed as described above, is described with reference to FIG. 20 and FIG. 21. FIG. 20 is an end view for illustrating the stator in the rotating electric machine according to the first embodiment of the present invention, and FIG. 21 is a sectional view taken along the line XXI-XXI of FIG. 20 when viewed in the direction indicated by the arrows.

Figure 21:
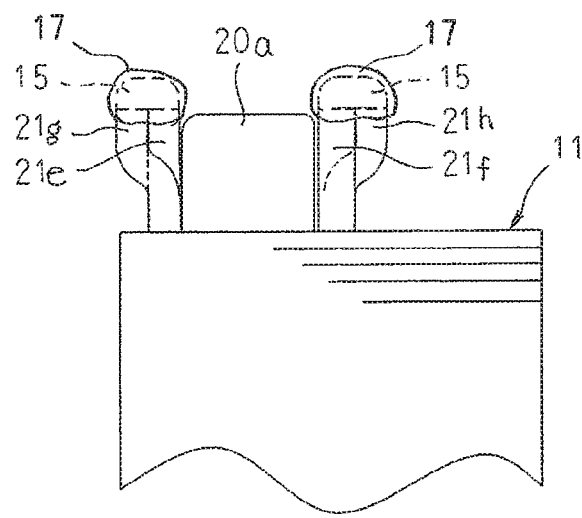
FIG. 21 is a sectional view taken along the line XXI-XXI of FIG. 20 when viewed in the direction indicated by the arrows.

In the stator 10, as illustrated in FIG. 20 and FIG. 21, six terminal pairs, each including the radially inner-side terminals 21e and 21g being held with each other in the radial direction, are arranged in the circumferential direction on the radially inner side of the coil end group 20a to form a group of terminal pairs. Five groups of the six terminal pairs are formed so as to be separate from each other in the circumferential direction. Six terminal pairs, each including the radially outer-side terminals 21f and 21h being held in contact with each other in the radial direction, are arranged in the circumferential direction on the radially outer side of the coil end group 20a to form a group of terminal pairs. Four groups of six terminal pairs are formed so as to be separate from each other in the circumferential direction. Each of beads 15 obtained by joining distal end portions of the pair of the radially inner-side terminals 21e and 21g to each other and distal end portions of the pair of the radially outer-side terminals 21f and 21h to each other by, for example, welding, is coated with an insulating member 17 such as an insulating tape, cap, or powder so as to be insulated. At this time, the insulating coating is released from a distal end portion of each of the terminals so that the distal end portions of the terminals are joined to each other. Thus, a portion of the distal end portion of each of the terminals at the periphery of the bead 15, from which the insulating coating is released, is coated and insulated with the insulating member 17 at the same time. The bead 15 and a portion of the distal end portions connected to each other, which is at the periphery of the bead 15, form a connecting portion.

The rotating electric machine 100 using the stator 10 obtained by the wire connection described above operates as a 10-pole, 60-slot inner rotor three-phase motor with AC power fed to the stator winding 20.

As described above, according to the first embodiment, sixty (the same number as a total number of slots) winding bodies 21 formed by distributed winding and lap winding are mounted to the stator core 11 at one-slot pitches. Then, the winding bodies 21 are formed so that the radially inner-side terminals 21e and 21g, each being one end of the conductor 19, extend from a radially innermost position in the slot 12 toward the one axial side of the stator core 11 and the radially outer-side terminals 21f and 21h, each being another end of the conductor 19, extend from a radially outermost position in the slot 12 toward the one axial side of the stator core 11. Further, each phase winding of the stator winding 20 is formed by directly joining the radially inner-side terminals 21e and 21g of the winding bodies 21 for forming the same phase to each other and directly joining the radially outer-side terminals 21*f* and 21*h* thereof to each other.

Thus, the radially inner-side terminals 21*e* and 21*g* and the radially outer-side terminals 21*f* and 21*h* are not required to be caused to pass on an axially outer side of the coil end group 20*a*. Thus, an axial dimension of the stator 10 can be reduced.

Further, another component such as a bus bar, which is configured to connect the terminals of the winding bodies 21 to each other, is not required. Thus, the number of components of the stator 10 can be reduced.

The radially inner-side terminal 21*e* of the first winding body 21A maintains the fourth radial position in the slot 12 from the radially outer side, and the radially outer-side terminal 21*f* maintains the first radial position in the slot 12 from the radially outer side. The radially inner-side terminal 21*g* of the second winding body 21B is displaced radially inward from the fourth radial position in the slot 12 from the radially outer side by the width d of the conductor wire 19, and the radially outer-side terminal 21*h* thereof is displaced radially outward from the first radial position in the slot 12 from the radially outer side by the width d of the conductor wire 19. In this manner, the radially inner-side terminal 21*g* can be led in the circumferential direction without interference with the radially inner-side terminal 21*e* so that an end of the radially inner-side terminal 21*g* is joined to an end of the radially inner-side terminal 21*e*, which is a target to be joined. Further, the radially outer-side terminal 21*h* can be led in the circumferential direction without interference with the radially outer-side terminal 21*f* so that an end of the radially outer-side terminal 21*h* is joined to an end of the radially outer-side terminal 21*f*, which is a target to be joined. Thus, radial projection of the coil end group 20*a* can be reduced.

Six radially outer-side terminals 21*f* and six radially outer-side terminal 21*h*, which extend from the radially outermost position in the slots 12, are arranged so that a group of the six radially outer-side terminals 21*f* and a group of the six radially outer-side terminals 21*h* are arranged alternately in the circumferential direction. The six radially outer-side terminals 21*f* extend from the slots 12 and are then bent in the first circumferential direction. The six radially outer-side terminals 21*h* extend from the slots 12 and are then bent in the second circumferential direction so as to be brought closer to the radially outer-side terminals 21*f* being targets to be connected, which are separate from the radially outer-side terminals 21*h* by six slots, to be connected to the radially outer-side terminals 21*f* being the targets to be connected. Specifically, the radially outer-side terminals 21*f* and 21*h* are bent in the different circumferential directions for every six slots. In the set of six radially outer-side terminals 21*f* and six radially outer-side terminals 21*h* in which the group of the six radially outer-side terminals 21*f* and the group of the six radially outer-side terminals 21*h* are adjacent to each other in the circumferential direction, each of the radially outer-side terminals 21*f* and a corresponding one of the radially outer-side terminals 21*h* are bent so as to be brought closer to each other. Further, in the set of the six radially outer-side terminals 21*f* and the six radially outer-side terminals 21*h* in which the group of the six radially outer-side terminals 21*f* and the group of the six radially outer-side terminals 21*h* are adjacent to each other in the circumferential direction, the first angle θ formed between the surface of the oblique-side portion 21*fs* of the radially outer-side terminal 21*f*, which is oriented forward in the first circumferential direction, and the end surface of the stator core 11 gradually decreases in the first circumferential direction. Further, the first angle θ formed between the surface of the oblique-side portion 21*hs* of the radially outer-side terminal 21*h*, which is oriented forward in the second circumferential direction, and the end surface of the stator core 11 gradually decreases in the second circumferential direction. As a result, a distance between the oblique-side portions 21*fs* of the radially outer-side terminals 21*f* adjacent to each other and a distance between the oblique-side portions 21*hs* of the radially outer-side terminals 21*h* adjacent to each other can be increased. Hence, an insulating property can be improved. Further, a distance between the connecting portions, each being formed between the distal end portion 21*fa* of the radially outer-side terminal 21*f* and the distal end portion 21*ha* of the radially outer-side terminal 21*h*, which are adjacent to each other, can be increased. Hence, the insulating property can be improved.

Six radially inner-side terminals 21*e* and six radially inner-side terminal 21*g*, which extend from the radially innermost position in the slots 12, are arranged so that a group of the six radially inner-side terminals 21*e* and a group of the six radially inner-side terminals 21*g* are arranged alternately in the circumferential direction. The six radially inner-side terminals 21*e* extend from the slots 12 and are then bent in the second circumferential direction. The six radially inner-side terminals 21*g* extend from the slots 12 and are then bent in the first circumferential direction so as to be brought closer to the radially inner-side terminals 21*e* being targets to be connected, which are separate from the radially inner-side terminals 21*g* by six slots, to be connected to the radially inner-side terminals 21*e* being the targets to be connected. Specifically, the radially inner-side terminals 21*e* and 21*g* are bent in the different circumferential directions for every six slots. In the set of six radially inner-side terminals 21*e* and six radially inner-side terminals 21*g* in which the group of the six radially inner-side terminals 21*e* and the group of the six radially inner-side terminals 21*g* are adjacent to each other in the circumferential direction, each of the radially inner-side terminals 21*e* and a corresponding one of the radially inner-side terminals 21*g* are bent so as to be brought closer to each other. Further, in the set of the six radially inner-side terminals 21*e* and the six radially inner-side terminals 21*g* in which the group of the six radially inner-side terminals 21*e* and the group of the six radially inner-side terminals 21*g* are adjacent to each other in the circumferential direction, the first angle θ formed between the surface of the oblique-side portion 21*fs* of the radially inner-side terminal 21*e*, which is oriented forward in the second circumferential direction, and the end surface of the stator core 11 gradually decreases in the second circumferential direction. Further, the first angle θ formed between the surface of the oblique-side portion 21*hs* of the radially inner-side terminal 21*g*, which is oriented forward in the first circumferential direction, and the end surface of the stator core 11 gradually decreases in the first circumferential direction. As a result, a distance between the oblique-side portions of the radially inner-side terminals 21*e* adjacent to each other and a distance between the oblique-side portions of the radially inner-side terminals 21*g* adjacent to each other can be increased. Hence, an insulating property can be improved. Further, a distance between the connecting portions, each being formed between the distal end portion of the radially inner-side terminal 21*e* and the distal end portion of the radially inner-side terminal 21*g*, which are adjacent to each other, can be increased. Hence, the insulating property can be improved.

In the first embodiment described above, the first angle θ formed between the oblique-side portion of the radially outer-side terminal and the end surface of the stator core and between the oblique-side portion of the radially inner-side terminal and the end surface of the stator core gradually decreases in a direction of being brought closer to the terminal to be joined. When insulating performance has a margin, the first angle θ may be the same for a plurality of the oblique-side portions as long as the first angle θ monotonously decreases in the direction of being brought closer to the terminal to be joined. For example, in FIG. 17, the first angles θ1 to θ6 may have a relationship of: θ1=θ2>θ3>θ4>θ5>θ6. Further, a potential difference between the terminals of the same phase is small. Thus, in a portion in which the terminals of the same phase are adjacent to each other in the circumferential direction, the first angle θ may be set to the same angle.

Second Embodiment

Figure 22:
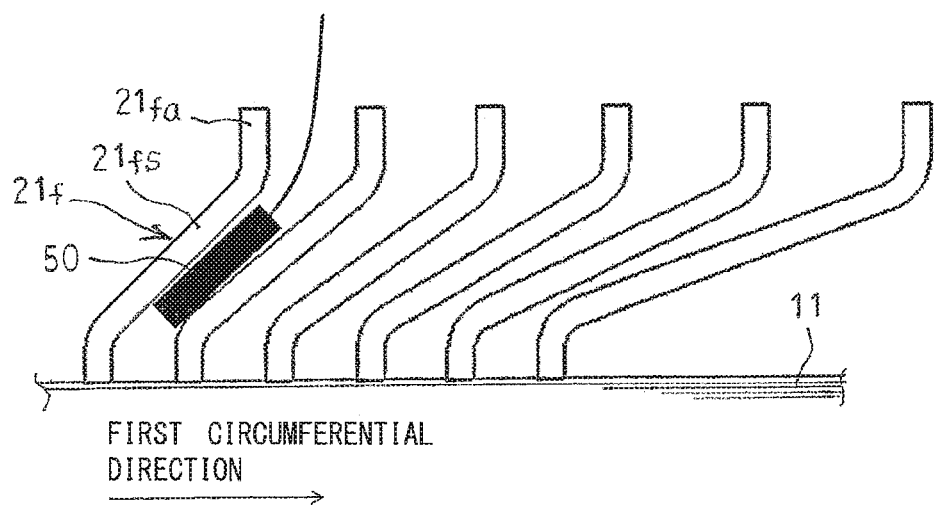
FIG. 22 is a side view of a main part, for illustrating a stator in a rotating electric machine according to a second embodiment of the present invention when viewed from a radially outer side.

FIG. 22 is a side view of a main part, for illustrating a stator in a rotating electric machine according to a second embodiment of the present invention when viewed from a radially outer side. In FIG. 22, only radially outer-side terminals are illustrated.

In FIG. 22, a thermistor 50 serving as a temperature detector is disposed between the oblique-side portions 21fs of the radially outer-side terminals 21f adjacent to each other in the circumferential direction.

Other configurations are the same as those of the first embodiment described above.

Even in the second embodiment, the first angle θ formed between the surface of the oblique-side portion 21fs of the radially outer-side terminal 21f, which is oriented forward in the first circumferential direction, and the end surface of the stator core 11, gradually decreases in the first circumferential direction, and a distance between the oblique-side portions 21fs of the radially outer-side terminals 21f adjacent to each other increases. Thus, the thermistor 50 can be stably installed under a state of being held in contact with the oblique-side portion 21fs of the radially outer-side terminal 21f. At the same time, a temperature of a coil end can be precisely measured.

Third Embodiment

Figure 23:
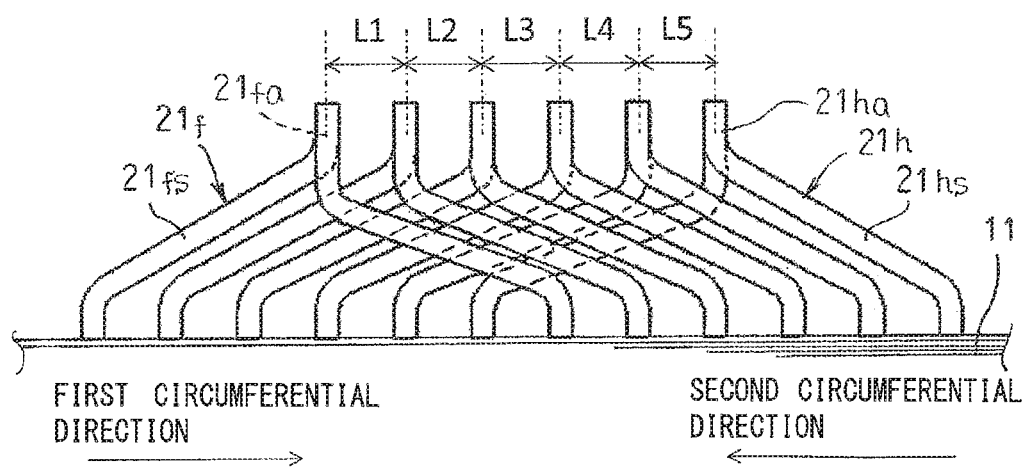
FIG. 23 is a side view of a main part, for illustrating a stator in a rotating electric machine according to a third embodiment of the present invention when viewed from a radially outer side.

FIG. 23 is a side view of a main part, for illustrating a stator in a rotating electric machine according to a third embodiment of the present invention when viewed from a radially outer side. In FIG. 23, only radially outer-side terminals are illustrated.

In FIG. 23, the distal end portion 21fa of the radially outer-side terminal 21f is bent at an end of the oblique-side portion 21fs, and the distal end portion 21ha of the radially outer-side terminal 21h is bent at an end of the oblique-side portions 21hs to extend axially outward. In the set of six radially outer-side terminals 21f and six radially outer-side terminals 21h in which the group of the six radially outer-side terminals 21f and the group of the six radially outer-side terminals 21h are adjacent to each other in the circumferential direction, distances L1, L2, L3, L4, and L5 between the pairs of the distal end portions, each including the distal end portion 21fa of the radially outer-side terminal 21f and the distal end portion 21ha of the radially outer-side terminal 21h, are the same. Height positions of the distal end portions 21fa of the radially outer-side terminals 21f and the distal end portions 21ha of the radially outer-side terminals 21h from the end surface of the stator core 11 are the same.

Other configurations are the same as those of the first embodiment described above.

According to the third embodiment, the distances L1, L2, L3, L4, and L5 between the pairs of the distal end portions, each including the distal end portion 21fa of the radially outer-side terminal 21f and the distal end portion 21ha of the radially outer-side terminal 21h, are the same, and the height positions of the distal end portions 21fa of the radially outer-side terminals 21f and the distal end portions 21ha of the radially outer-side terminals 21h from the end surface of the stator core 11 are the same for the pairs. Thus, a step of connecting the distal end portion 21fa of the radially outer-side terminal 21f and the distal end portion 21ha of the radially outer-side terminal 21h is simplified. At the same time, stable joint strength can be obtained.

In the third embodiment, in the set of the six radially outer-side terminals 21f and the six radially outer-side terminals 21h in which the group of the six radially outer-side terminals 21f and the group of the six radially outer-side terminals 21h are adjacent to each other in the circumferential direction, the first angle θ formed between the surface of the oblique-side portion 21fs of the radially outer-side terminal 21f, which is oriented forward in the first circumferential direction, and the end surface of the stator core 11 gradually decreases in the first circumferential direction. Further, the first angle θ formed between the surface of the oblique-side portion 21hs of the radially outer-side terminal 21h, which is oriented forward in the second circumferential direction, and the end surface of the stator core 11 gradually decreases in the second circumferential direction. Thus, a height position of a bent portion of the oblique-side portion 21fs, at which the distal end portion 21fa of the radially outer-side terminal 21f is defined, from the end surface of the stator core 11 is gradually decreased in the first circumferential direction. Further, a height position of a bent portion of the oblique-side portion 21hs, at which the distal end portion 21ha of the radially outer-side terminal 21h is defined, from the end surface of the stator core 11 is gradually decreased in the second circumferential direction. In this manner, the height positions of the connecting portions, each being formed between the distal end portion 21fa of the radially outer-side terminal 21f and the distal end portion 21ha of the radially outer-side terminal 21h, are set to be the same. Further, the distances between the pairs, each including the distal end portion 21fa of the radially outer-side terminal 21f and the distal end portion 21ha of the radially outer-side terminal 21h, are set to be the same.

The radially outer-side terminals 21f and 21h have been described. However, the radially inner-side terminals 21e and 21g are formed in a similar manner.

In the third embodiment, the configuration applied to the rotating electric machine according to the first embodiment has been described. However, the configuration may be applied to a rotating electric machine according to other embodiments.

Fourth Embodiment

Figure 24:
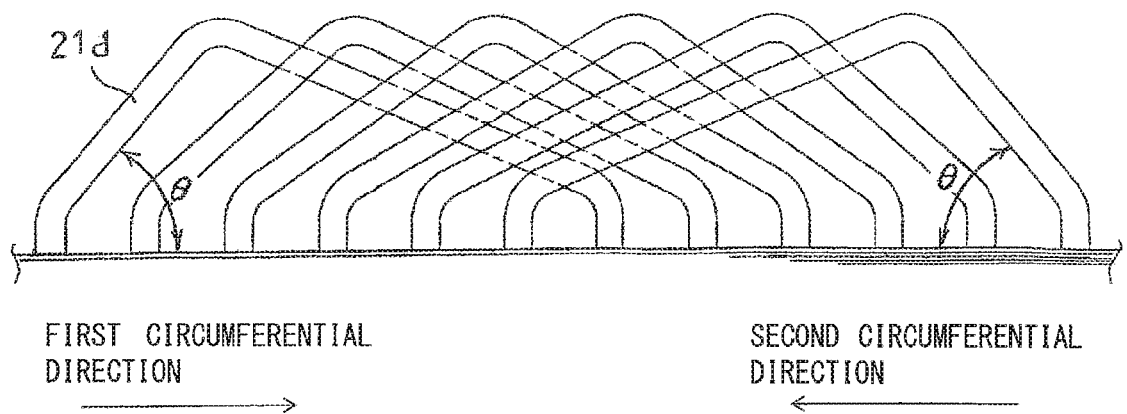
FIG. 24 is a side view of a main part, for illustrating a stator in a rotating electric machine according to a fourth embodiment of the present invention when viewed from a radially outer side.

FIG. 24 is a side view of a main part, for illustrating a stator in a rotating electric machine according to a fourth embodiment of the present invention when viewed from a radially outer side. In FIG. 24, only the second coil end 21d is illustrated.

In FIG. 24, in a set of six second coil ends 21d arranged in the circumferential direction, for the second coil end 21d having an oblique-side portion bent in the first circumferential direction, the first angle θ formed between a surface of the oblique-side portion of the second coil end 21*d*, which is oriented forward in the first circumferential direction, and the end surface of the stator core monotonously decreases in the first circumferential direction. For the second coil end 21*d* having an oblique-side portion bent in the second circumferential direction, the first angle θ formed between a surface of the oblique-side portion of the second coil end 21*d*, which is oriented forward in the second circumferential direction, and the end surface of the stator core monotonously decreases in the second circumferential direction. The oblique-side portion is bent in the second circumferential direction. Height positions of tops of the second coil ends 21*d* from the end surface of the stator core 11 are constant.

Other configurations are the same as those of the first embodiment described above.

According to the fourth embodiment, a distance between the oblique-side portions of the second coil ends 21*d* adjacent to each other in the circumferential direction is increased. Hence, the insulating property can be improved.

The second coil ends 21*d* have been described. However, even for a first angle formed between each of a pair of oblique-side portions through top of a first coil end 21*c* therebetween and the end surface of the stator core, similarly to the second coil end 21*d*, the first angle formed between the surface oriented forward in a bending direction of the oblique-side portion and the end surface of the stator core monotonously decreases in the bending direction.

In the fourth embodiment, the configuration applied to the rotating electric machine according to the first embodiment has been described. However, the configuration may be applied to a rotating electric machine according to other embodiments.

Fifth Embodiment

Figure 25A:
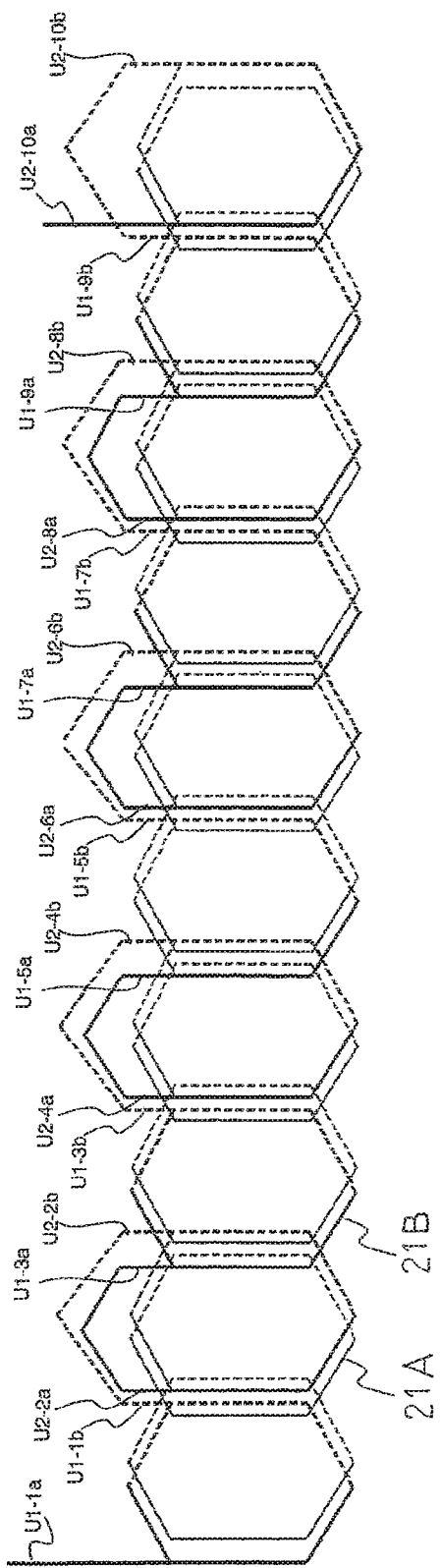
FIG. 25A is a view for illustrating wire connection of a stator winding in a rotating electric machine according to a fifth embodiment of the present invention.

FIG. 25A is a view for illustrating wire connection of a stator winding in a rotating electric machine according to a second embodiment of the present invention, and FIG. 25B is a view for illustrating wire connection of the stator winding in the rotating electric machine according to the second embodiment of the present invention.

The third embodiment has the same configuration as that of the first embodiment described above except for a difference in the wire connection method for the stator winding.

First, as illustrated in FIG. 25A, connection between U1-1*b* and U2-2*b*, U2-2*a* and U1-3*a*, U1-3*b* and U2-4*b*, U2-4*a* and U1-5*a*, U1-5*b* and U2-6*b*, U2-6*a* and U1-7*a*, U1-7*b* and U2-8*b*, U2-8*a* and U1-9*a*, and U1-9*b* and U2-10*b* is performed by, for example, welding to form the U1-phase winding.

Further, as illustrated in FIG. 25B, connection between U2-1*b* and U1-2*b*, U1-2*a* and U2-3*a*, U2-3*b* and U1-4*b*, U1-4*a* and U2-5*a*, U2-5*b* and U1-6*b*, U1-6*a* and U2-7*a*, U2-7*b* and U1-8*b*, U1-8*a* and U2-9*a*, and U2-9*b* and U1-10*b* is performed by, for example, welding to form the U2-phase winding. Subsequently, U2-10*a* and U2-1*a* are connected by, for example, welding to connect the U1-phase winding and the U2-phase winding in series. As a result, the U-phase winding having U1-1*a* as a feeding terminal and U1-10*a* as a neutral point is formed.

The V-phase winding and the W-phase winding are formed in a similar manner. The neutral points are wire-connected to obtain the stator winding formed as a three-phase AC winding in which the U-phase winding, the V-phase winding, and the W-phase winding are wire-connected in a Y-connection configuration.

Even in the fifth embodiment, the winding bodies 21 are mounted to the stator core at one-slot pitches so that the radially inner-side terminals 21*e* and 21*g* of the winding bodies 21 project toward the radially inner side of the coil end group 20*a* and the radially outer-side terminals 21*f* and 21*h* of the radially outer-side terminals 21*f* and 21*h* project toward the radially outer side of the coil end group 20*a*. Then, the radially inner-side terminals 21*e* and 21*g* of the winding bodies 21 for forming the same phase are directly joined to each other and the radially outer-side terminals 21*f* and 21*h* thereof are directly joined to each other to form each phase winding.

The radially outer-side terminals 21*f* and 21*h* are bent in the different circumferential directions for every six slots. In the set of six radially outer-side terminals 21*f* and six radially outer-side terminals 21*h* in which the group of the six radially outer-side terminals 21*f* and the group of the six radially outer-side terminals 21*h* are adjacent to each other in the circumferential direction, each of the radially outer-side terminals 21*f* and a corresponding one of the radially outer-side terminals 21*h* are bent so as to be brought closer to each other. Further, in the set of the six radially outer-side terminals 21*f* and the six radially outer-side terminals 21*h* in which the group of the six radially outer-side terminals 21*f* and the group of the six radially outer-side terminals 21*h* are adjacent to each other in the circumferential direction, the first angle θ formed between the surface of the oblique-side portion of the radially outer-side terminal 21*f*, which is oriented forward in the first circumferential direction, and the end surface of the stator core 11 gradually decreases in the first circumferential direction. Further, the first angle θ formed between the surface of the oblique-side portion of the radially outer-side terminal 21*h*, which is oriented forward in the second circumferential direction, and the end surface of the stator core 11 gradually decreases in the second circumferential direction.

The radially inner-side terminals 21*e* and 21*g* are bent in the different circumferential directions for every six slots. In the set of six radially inner-side terminals 21*e* and six radially inner-side terminals 21*g* in which the group of the six radially inner-side terminals 21*e* and the group of the six radially inner-side terminals 21*g* are adjacent to each other in the circumferential direction, each of the radially inner-side terminals 21*e* and a corresponding one of the radially inner-side terminals 21*g* are bent so as to be brought closer to each other. Further, in the set of the six radially inner-side terminals 21*e* and the six radially inner-side terminals 21*g* in which the group of the six radially inner-side terminals 21*e* and the group of the six radially inner-side terminals 21*g* are adjacent to each other in the circumferential direction, the first angle θ formed between the surface of the oblique-side portion of the radially inner-side terminal 21*e*, which is oriented forward in the second circumferential direction, and the end surface of the stator core 11 gradually decreases in the second circumferential direction. Further, the first angle θ formed between the surface of the oblique-side portion 21*hs* of the radially inner-side terminal 21*g*, which is oriented forward in the first circumferential direction, and the end surface of the stator core 11 gradually decreases in the first circumferential direction.

Accordingly, even in the fifth embodiment, the same effects as those of the first embodiment described above are obtained.

Sixth Embodiment

Figure 26:
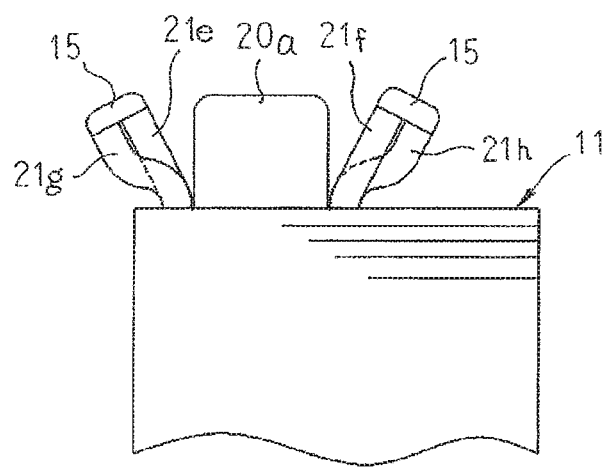
FIG. 26 is a sectional view of a main part, for illustrating a periphery of a coil end group of a stator in a rotating electric machine according to a sixth embodiment of the present invention.

FIG. 26 is a sectional view of a main part, for illustrating a periphery of a coil end group of a stator in a rotating electric machine according to a sixth embodiment of the present invention.

In FIG. 26, a pair of the radially inner-side terminals 21e and 21g, which are held in contact with each other in the radial direction, are inclined to the radially inner side, and hence the bead 15 is separated from the coil end group 20a to the radially inner side. A pair of the radially outer-side terminals 21f and 21h, which are held in contact with each other in the radial direction, are inclined to the radially outer side, and hence the bead 15 is separated from the coil end group 20a to the radially outer side.

Other configurations are the same as those of the first embodiment described above.

According to the sixth embodiment, the radially inner-side terminals 21e and 21g are inclined to the radially inner side, and hence the bead 15 serving as the connecting portion for the pair of the radially inner-side terminals 21e and 21g is separated from the coil end group 20a to the radially inner side. The radially outer-side terminals 21f and 21h are inclined to the radially outer side, and hence the bead 15 serving as the connecting portion for the pair of the radially outer-side terminals 21f and 21h is separated from the coil end group 20a to the radially outer side. With the configuration described above, the axial height of the terminals of the winding bodies 21 can be reduced. Further, generation of damage of the insulating coating for the conductor wire for forming the coil ends, which may be caused by fire of a torch or sputtering at the time of joint between the pair of the radially outer-side terminals 21f and 21h, can be suppressed.

In the sixth embodiment, the configuration applied to the rotating electric machine according to the first embodiment has been described. However, the configuration may be applied to a rotating electric machine according to other embodiments.

Seventh Embodiment

Figure 27:
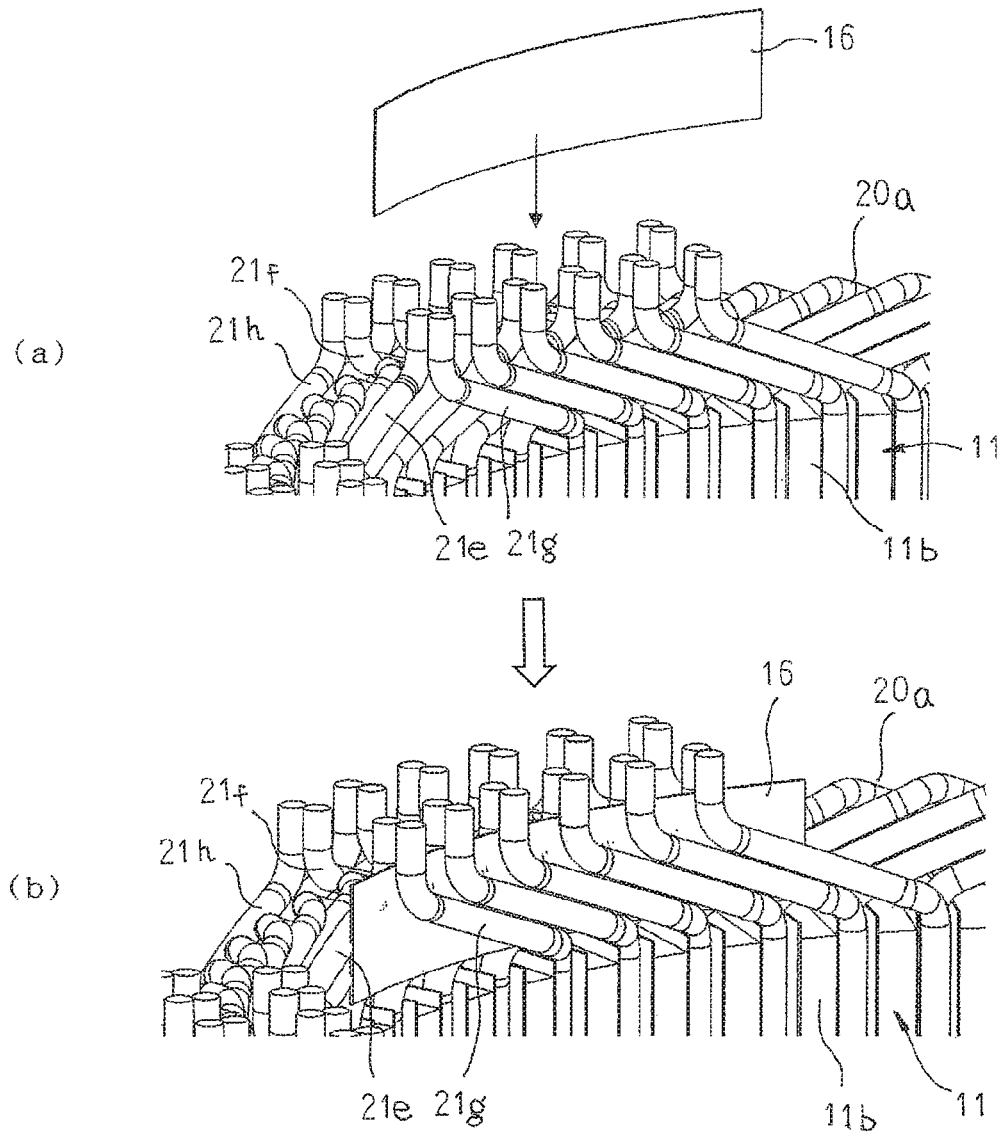
FIG. 27 is a view for illustrating a phase-to-phase insulation method for a stator winding in a rotating electric machine according to a seventh embodiment of the present invention.

FIG. 27 is a view for illustrating a phase-to-phase insulation method for a stator winding in a rotating electric machine according to a seventh embodiment of the present invention.

In the seventh embodiment, as illustrated in part (a) of FIG. 27, prior to a step of joining the pair of the radially inner-side terminals 21e and 21g, which are held in contact with each other in the radial direction, an insulating sheet 16 made of, for example, polyimide, aramid, polyethylene terephthalate (PET), or polyphenylene sulfide (PPS) is inserted between the radially inner-side terminals 21e and 21g that form the pair from the axially outer side. In this manner, as illustrated in part (b) of FIG. 27, the insulating sheet 16 is arranged between the radially inner-side terminals 21e and 21g, which cross each other when viewed from the radially inner side. The insulating sheet 16 is similarly arranged between the radially outer-side terminals 21f and 21h, which cross each other when viewed from the radially outer side.

Other configurations are the same as those of the first embodiment described above.

According to the seventh embodiment, the insulating sheets 16 are arranged between the radially inner-side terminals 21e and 21g of different phases, which cross each other when viewed from the radial direction, and between the radially outer-side terminals 21f and 21h of different phases, which cross each other when viewed from the radial direction, respectively. Thus, phase-to-phase insulation is ensured, and hence the stator having a high insulating property is obtained.

In the first to seventh embodiments described above, the winding body is formed by helically winding the conductor wire two turns. However, the number of turns of the conductor wire is not limited to two, and may be any number equal to or larger than two.

In the seventh embodiment, the configuration applied to the rotating electric machine according to the first embodiment has been described. However, the configuration may be applied to a rotating electric machine according to other embodiments.

Eighth Embodiment

Figure 28:
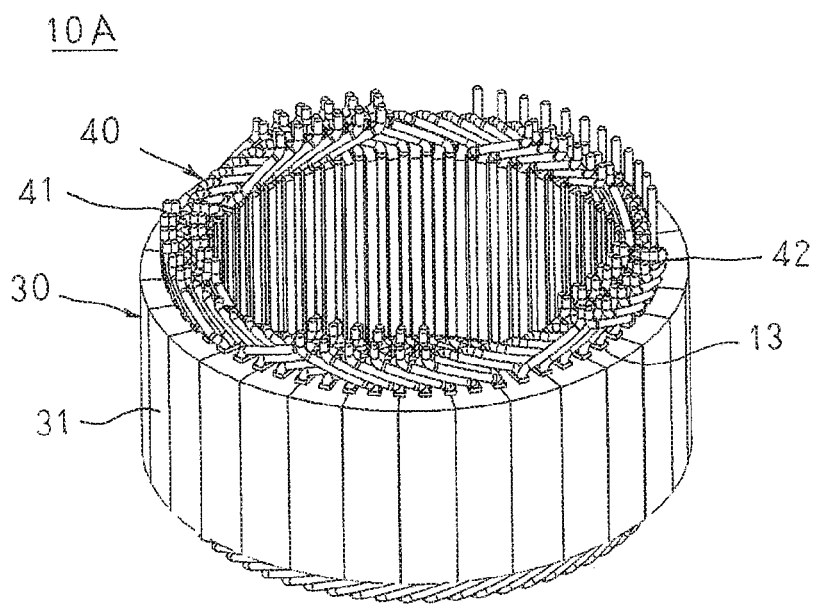
FIG. 28 is a perspective view for illustrating a stator to be applied to a rotating electric machine according to an eighth embodiment of the present invention.
Figure 29:
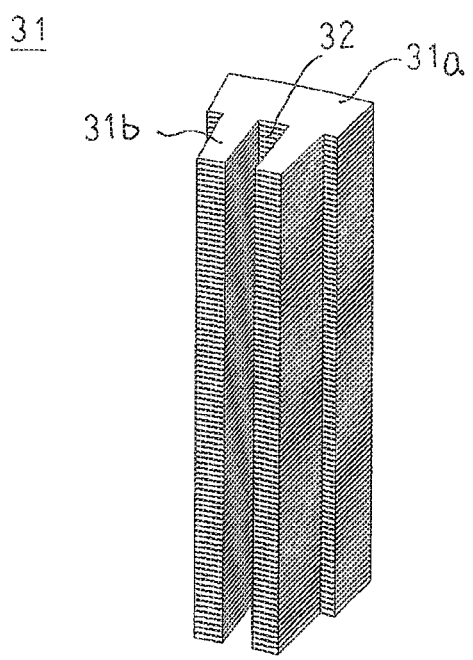
FIG. 29 is a perspective view for illustrating a core block for forming a stator core to be applied to the rotating electric machine according to the eighth embodiment of the present invention.
Figure 30:
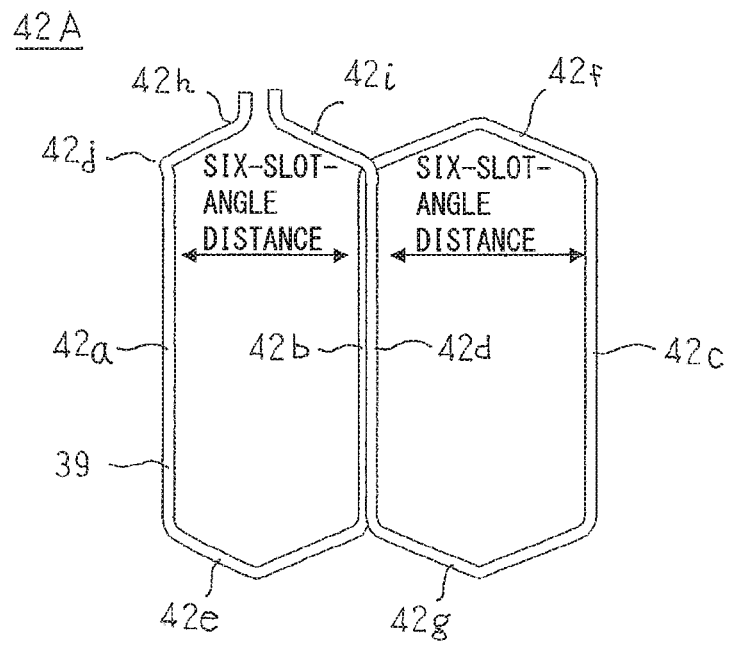
FIG. 30 is a front view for illustrating a first winding body for forming a stator winding in the rotating electric machine according to the eighth embodiment of the present invention.
Figure 31:
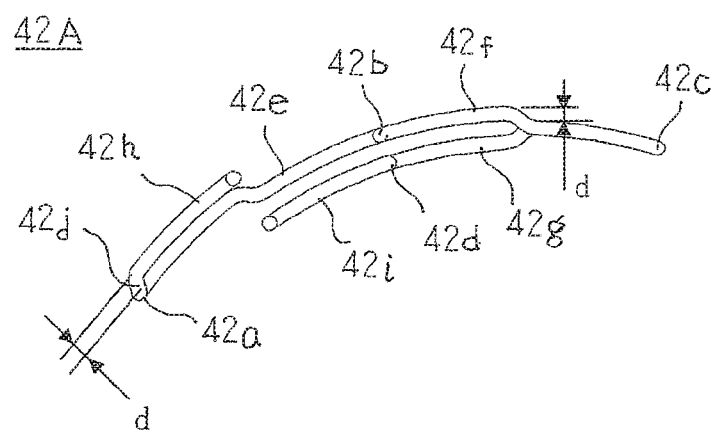
FIG. 31 is a plan view for illustrating the first winding body for forming the stator winding in the rotating electric machine according to the eighth embodiment of the present invention.
Figure 32:
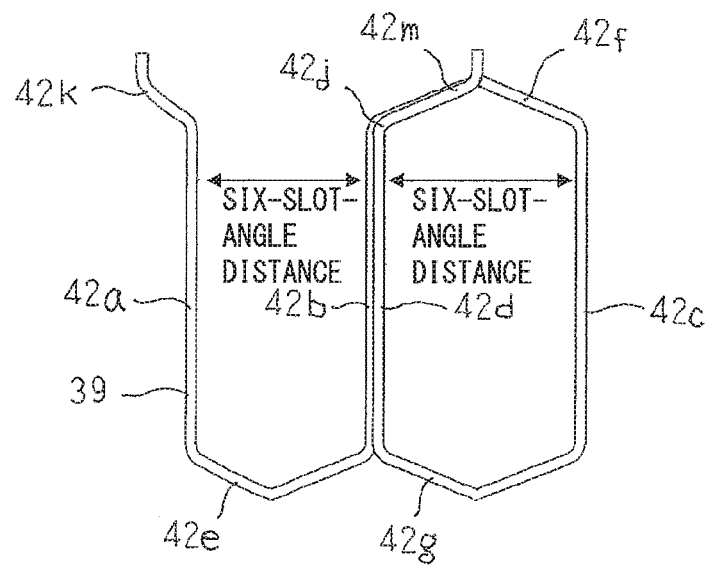
FIG. 32 is a front view for illustrating a second winding body for forming the stator winding in the rotating electric machine according to the eighth embodiment of the present invention.
Figure 33:
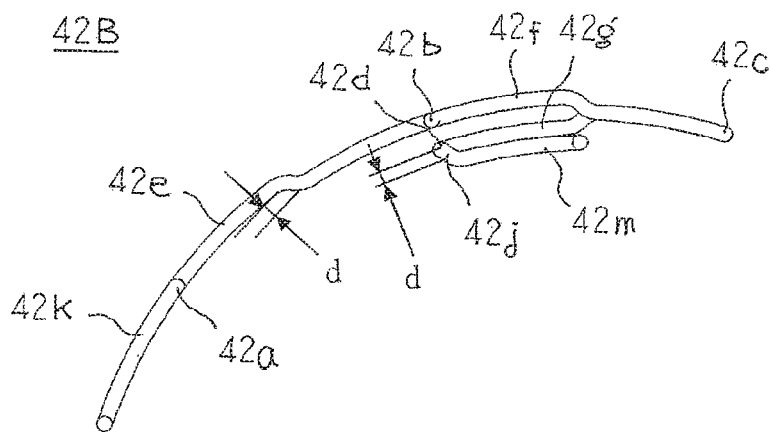
FIG. 33 is a plan view for illustrating the second winding body for forming the stator winding in the rotating electric machine according to the eighth embodiment of the present invention.
Figure 34:
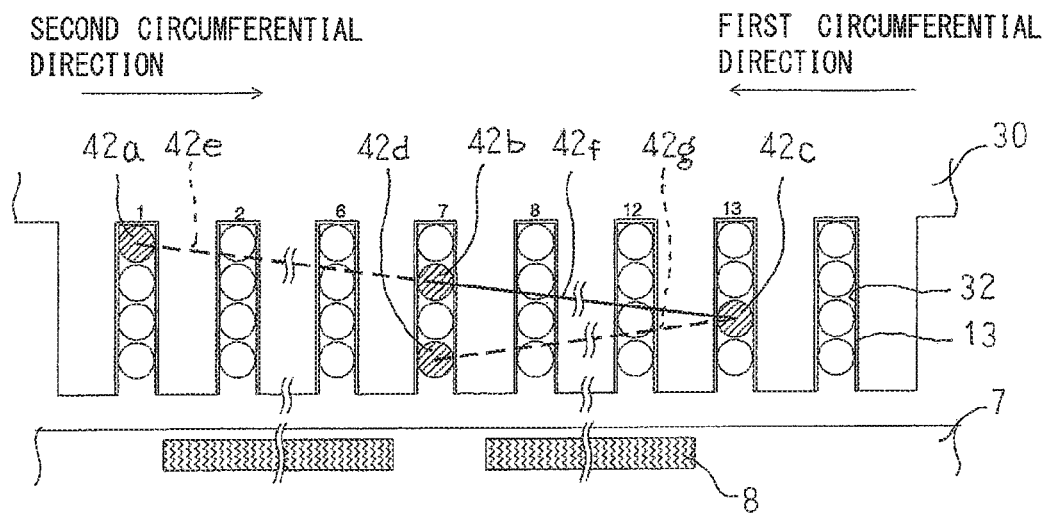
FIG. 34 is a sectional view of a main part, for schematically illustrating a state in which winding bodies are accommodated in slots in the rotating electric machine according to the eighth embodiment of the present invention.
Figure 35:
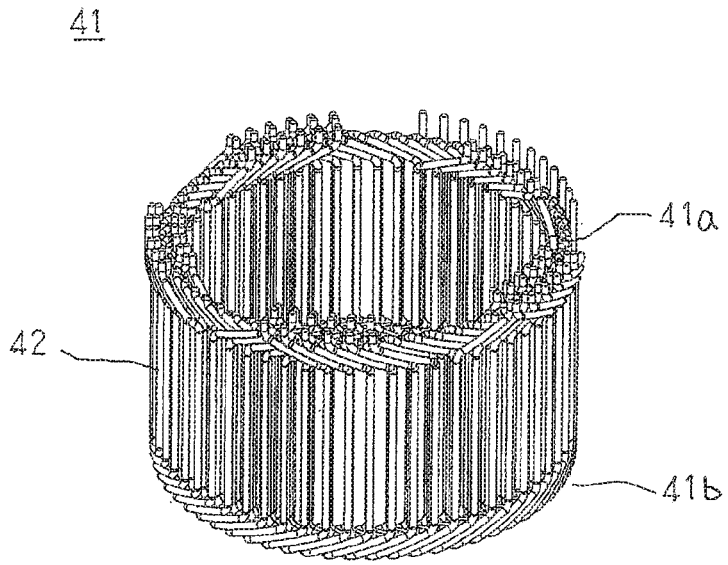
FIG. 35 is a perspective view for illustrating a winding assembly for forming the stator winding in the rotating electric machine according to the eighth embodiment of the present invention.
Figure 36:
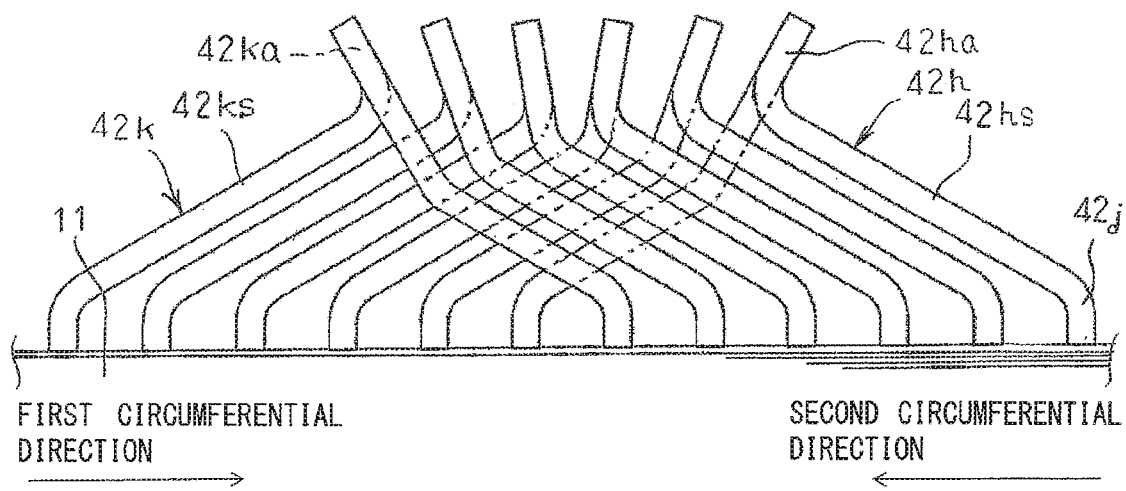
FIG. 36 is a side view of a main part, for illustrating the stator in the rotating electric machine according to the eighth embodiment of the present invention when viewed from a radially outer side.
Figure 37:
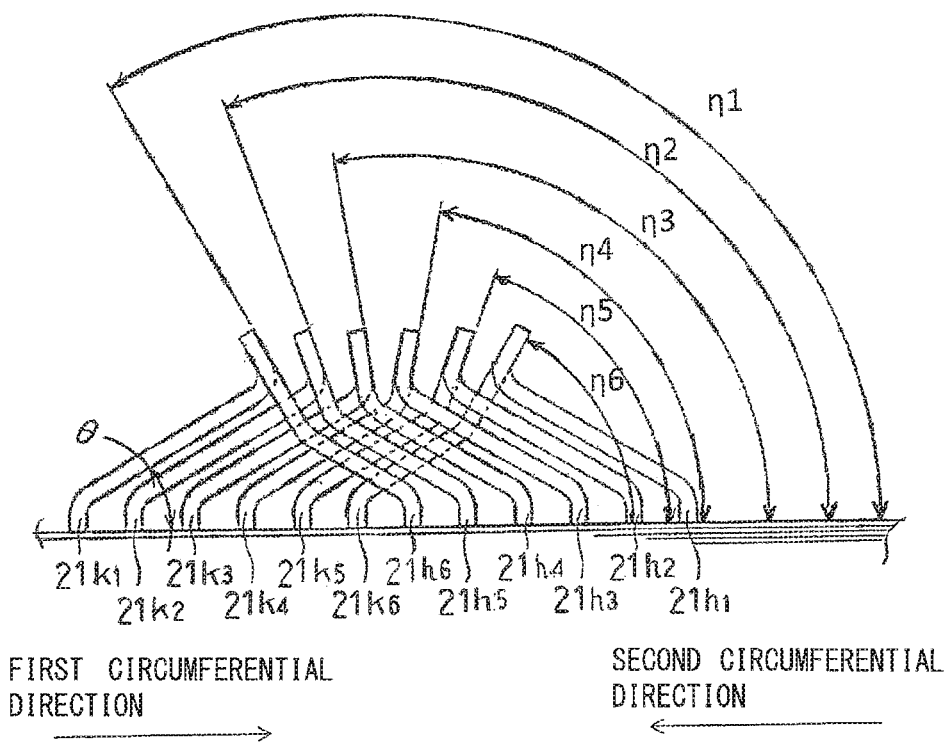
FIG. 37 is a view for illustrating bending shapes of radially outer-side terminals of the stator winding in the rotating electric machine according to the eighth embodiment of the present invention.

FIG. 28 is a perspective view for illustrating a stator to be applied to a rotating electric machine according to an eighth embodiment of the present invention. FIG. 29 is a perspective view for illustrating a core block for forming a stator core to be applied to the rotating electric machine according to the eighth embodiment of the present invention. FIG. 30 is a front view for illustrating a first winding body for forming a stator winding in the rotating electric machine according to the eighth embodiment of the present invention. FIG. 31 is a plan view for illustrating the first winding body for forming the stator winding in the rotating electric machine according to the eighth embodiment of the present invention. FIG. 32 is a front view for illustrating a second winding body for forming the stator winding in the rotating electric machine according to the eighth embodiment of the present invention. FIG. 33 is a plan view for illustrating the second winding body for forming the stator winding in the rotating electric machine according to the eighth embodiment of the present invention. FIG. 34 is a sectional view of a main part, for schematically illustrating a state in which the winding bodies are accommodated in slots in the rotating electric machine according to the eighth embodiment of the present invention. FIG. 35 is a perspective view for illustrating a winding assembly for forming the stator winding in the rotating electric machine according to the eighth embodiment of the present invention. FIG. 36 is a side view of a main part, for illustrating the stator in the rotating electric machine according to the eighth embodiment of the present invention when viewed from a radially outer side. FIG. 37 is a view for illustrating bending shapes of radially outer-side terminals of the stator winding in the rotating electric machine according to the eighth embodiment of the present invention. In FIG. 36 and FIG. 37, only the radially outer-side terminals are illustrated.

In FIG. 28 a stator 10A includes a stator core 30 having an annular shape, a stator winding 40 mounted to the stator core 30, and slot cells 13. The slot cells 13 electrically separate the stator winding 40 and the stator core 30 from each other. For convenience of the description, a pole number p is set to 10, a slot number of the stator core 30 is set to 60, and a three-phase winding is set as the stator winding 20. Specifically, the slots are formed in the stator core 30 in a proportion of two slots per phase for each pole.

A core block 31 is obtained by, as illustrated in FIG. 29, equally dividing the stator core 30 having the annular shape into thirty blocks in a circumferential direction of the stator core 30. The core block 31 is formed by stacking and integrating a plurality of electromagnetic steel sheets. The core block 31 includes a core back portion 31a having an arc-shaped cross section and two teeth 31b projecting radially inward from an inner peripheral wall surface of the core back portion 31a. The stator core 30 is formed into the annular shape by arranging and integrating thirty core blocks 31 in the circumferential direction while the teeth 31b are oriented radially inward and circumferential side surfaces of the core back portions 31a abut against each other. Slots 32 formed between the core blocks 31 adjacent to each other in the circumferential direction are arranged at equiangular pitches in the circumferential direction so as to be open toward an inner peripheral side. Each of the teeth 31b is formed into a tapered shape having a circumferential width gradually decreasing to a radially inner side. A cross section of each of the slots 32, which is orthogonal to an axial direction of the stator core 30, is rectangular. As described above, the stator core 30 has the same configuration as that of the stator core 11 described above except that the stator core 30 is formed into the annular shape by arranging the thirty core blocks 31 in the circumferential direction.

Winding bodies 42 for forming the stator winding 40 include first winding bodies 42A and a second winding bodies 42B. In the first winding bodies 42 and the second winding bodies 42B, terminals extend in different directions. Each of the first winding body 42A and the second winding body 42B is formed by inserting a conductor wire 39 having a circular cross section with the diameter d, which is formed of, for example, a copper wire or an aluminum wire, which is insulation-coated with an enamel resin and is continuous without any connecting portions, into a first slot, a second slot, and a third slot, which are arranged at six-slot-angle distances in the circumferential direction. The conductor wire 39 is inserted into the first slot, the second slot, the third slot, and the second slot in the started order so that an insertion direction into the first slot, the second slot, and the third slot from an axial direction are changed alternately to form each of the first winding body 42A and the second winding body 42B into a δ-shaped coil pattern. The winding body 42 may also be formed with use of a conductor wire having a rectangular cross section in place of the conductor wire 39 having the circular cross section.

The first winding body 42A includes, as illustrated in FIG. 30 and FIG. 31, a first straight portion 42a, a second straight portion 42b, a third straight portion 42c, a fourth straight portion 42d, a first coil end 42e, a second coil end 42f, a third coil end 42g, a radially outer-side terminal 42h, and a radially inner-side terminal 42i. The first straight portion 42a, the second straight portion 42b, the third straight portion 42c, and the fourth straight portion 42d are arranged in three rows arranged at six-slot-angle distances. The first coil end 42e connects one end of the first straight portion 42a in a length direction and one end of the second straight portion 42b in the length direction to each other. The second coil end 42f connects another end of the second straight portion 42b in the length direction and another end of the third straight portion 42c in the length direction to each other. The third coil end 42g connects one end of the third straight portion 42c in the length direction and one end of the fourth straight portion 42d in the length direction to each other. The radially outer-side terminal 42h extends from another end of the first straight portion 42a in the length direction. The radially inner-side terminal 42i extends from another end of the fourth straight portion 42d in the length direction. The six-slot-angle distance corresponds to one magnetic-pole pitch.

More specifically, the first winding body 42A is formed into the δ-shaped coil pattern in the following manner, as illustrated in FIG. 34. The conductor wire 39 is inserted into a first layer inside a first slot 32 from one axial end side of the stator core 30, extends from the first slot 32 to another axial side of the stator core 30 to be inserted into a second layer in a seventh slot 32, which is separate by the six-slot-angle distance in the second circumferential direction, extends from the seventh slot 32 to the one axial end side of the stator core 30 to be inserted into a third layer in a thirteenth slot 32, which is separate by the six-slot-angle distance in the second circumferential direction, extends from the thirteenth slot 32 to the another axial end side of the stator core 30 to be inserted into a fourth layer in the seventh slot 32, which is separate by the six-slot-angle distance in the first circumferential direction, and extends from the seventh slot 32 to the one axial end side of the stator core 30.

Positions of accommodation of the conductor wire 39 accommodated in the slot 32 are referred to as the first layer, the second layer, the third layer, and the fourth layer from the radially outer side for convenience. In FIG. 34, the numbers 1, 2 . . . 12, and 13 are slot numbers allocated to the slots 32 in the order of arrangement in the circumferential direction.

The first straight portion 42a is accommodated in the first layer in the first slot 32, the second straight portion 42b and the fourth straight portion 42d are accommodated in the second layer and the fourth layer in the seventh slot 32, and the third straight portion 42c is accommodated in the third layer in the thirteenth slot 32. Specifically, the first straight portion 42a, the second straight portion 42b, the third straight portion 42c, and the fourth straight portion 42d are arranged in the three rows located at the six-slot-angle distances.

The first coil end 42e extending from the first layer in the first slot 32 to the another axial end side of the stator core 30 extends axially outward to another circumferential side at a constant inclination while maintaining a radial position, is displaced radially inward by d at a center (top), and then extends axially inward in the second circumferential direction at an inclination in the opposite direction while maintaining the radial position to be inserted into the second layer in the seventh slot 32.

The second coil end 42f extending from the second layer in the seventh slot 32 to the one axial end side of the stator core 30 extends axially outward in the second another circumferential direction at a constant inclination while maintaining a radial position, is displaced radially inward by d at a center (top), and then extends axially inward in the second circumferential direction at an inclination in the opposite direction while maintaining the radial position to be inserted into the third layer in the thirteenth slot 32.

The third coil end 42g extending from the third layer in the thirteenth slot 32 to the another axial end side of the stator core 30 extends axially outward in the first circumferential direction at a constant inclination while maintaining a radial position, is displaced radially inward by d at a center (top), and then extends axially inward in the first circumferential direction at an inclination in the opposite direction while maintaining the radial position to be inserted into the fourth layer in the seventh slot 32.

As described above, each of the first coil end 42e, the second coil end 42f, and the third coil end 42g has a crank portion, which is displaced in the radial direction by the radial width of the conductor wire 39, at the top.

The radially outer-side terminal 42h, which extends from the first layer in the first slot 32 to the one axial end side of the stator core 30, as illustrated in FIG. 30 and FIG. 31, is bent at a displacement portion 42j to be displaced radially outward by d, then extends radially outward in the second circumferential direction at a constant inclination while maintaining a radial position, and is bent at an approximate center (top) to extend axially outward.

The radially inner-side terminal 42i, which extends from the fourth layer in the seventh slot 32 to the one axial end side of the stator core 30, as illustrated in FIG. 30 and FIG. 31, extends radially outward in the first circumferential direction at a constant inclination while maintaining a radial position, and is bent at an approximate center (top) to extend axially outward.

The second winding body 42B includes, as illustrated in FIG. 32 and FIG. 33, the first straight portion 42a, the second straight portion 42b, the third straight portion 42c, the fourth straight portion 42d, the first coil end 42e, the second coil end 42f, the third coil end 42g, a radially outer-side terminal 42k, and a radially inner-side terminal 42m. The first straight portion 42a, the second straight portion 42b, the third straight portion 42c, and the fourth straight portion 42d are arranged in three rows arranged at six-slot-angle distances. The first coil end 42e connects the one end of the first straight portion 42a in the length direction and the one end of the second straight portion 42b in the length direction to each other. The second coil end 42f connects the another end of the second straight portion 42b in the length direction and the another end of the third straight portion 42c in the length direction to each other. The third coil end 42g connects one end of the third straight portion 42c in the length direction and the one end of the fourth straight portion 42d in the length direction to each other. The radially outer-side terminal 42k extends from the another end of the first straight portion 42a in the length direction. The radially inner-side terminal 42m extends from the another end of the fourth straight portion 42d in the length direction. The second winding body 42B is formed into a δ-shaped coil pattern. Specifically, the second winding body 42B is formed to have the same configuration as that of the first winding body 42A except for the radially outer-side terminal 42k and the radially inner-side terminal 42m.

In the second winding body 42B, similarly to the first winding body 42A, the first straight portion 42a is accommodated in the first layer in the first slot 32, the second straight portion 42b and the fourth straight portion 42d are accommodated in the second layer and the fourth layer in the seventh slot 32, and the third straight portion 42c is accommodated in the third layer in the thirteenth slot 32.

The radially outer-side terminal 42k, which extends from the first layer in the first slot 32 to the one axial end side of the stator core 30, as illustrated in FIG. 32 and FIG. 33, extends axially outward in the first circumferential direction at a constant inclination while maintaining a radial position, and is bent at an approximate center (top) to extend axially outward.

The radially inner-side terminal 42m, which extends from the fourth layer in the seventh slot 32 to the one axial end side of the stator core 30, as illustrated in FIG. 32 and FIG. 33, is bent at a displacement portion 42j to be displaced radially inward by d, then extends radially outward in the second circumferential direction at a constant inclination while maintaining a radial position, and is bent at an approximate center (top) to extend axially outward.

The first winding bodies 42A and the second winding bodies 42B, which are formed as described above, are arranged in the circumferential direction at one-slot pitches so that a group of six first winding bodies 42A and a group of six second winding bodies 42B are arranged alternately in the circumferential direction to thereby form a winding assembly 41 having an annular shape, which is illustrated in FIG. 35. The winding assembly 41 includes thirty first winding bodies 42A and thirty second winding bodies 42B.

In the winding assembly 41 formed as described above, the first straight portion 42a, the second straight portion 42b, the third straight portion 42c, and the fourth straight portion 42d are arranged in one row in the radial direction, and sixty rows are arranged in the circumferential direction at one-slot pitches.

On one axial end side of the winding assembly 41, a second coil end row formed by arranging the second coil ends 42f in the circumferential direction at one-slot pitches forms a first coil end group 41a. On another axial end side of the winding assembly 41, a second coil end group 41b is formed. The second coil end group 41b includes a first coil end row and a third coil end row, which are two rows arranged in the radial direction. The first coil end row is formed by arranging the first coil ends 42e in the circumferential direction at one-slot pitches. The third coil end row is formed by arranging the third coil ends 42g in the circumferential direction at one-slot pitches.

Each terminal pair includes the first winding body 42A and the second winding body 42B, which are separate from each other by 180 degrees in electrical angle so that an end of the radially outer-side terminal 42h of the first winding body 42A and an end of the radially outer-side terminal 42k of the second winding body 42B are held in contact with each other in the radial direction. Four sets, each including the six terminal pairs described above arranged in the circumferential direction, are arranged on the radially outer side of the first coil end group 41a so as to be separate from each other in the circumferential direction. Further, each terminal pair includes the first winding body 42A and the second winding body 42B, which are separate from each other by 180 degrees in electrical angle so that an end of the radially inner-side terminal 42i of the first winding body 42A and an end of the radially inner-side terminal 42m of the second winding body 42B are held in contact with each other in the radial direction. Five sets, each including the six terminal pairs described above arranged in the circumferential direction, are arranged on the radially inner side of the first coil end group 41a so as to be separate from each other in the circumferential direction.

In the set of six terminal pairs arranged in the circumferential direction, in which the distal end portions of the radially outer-side terminals 42h of the first winding bodies 42A and the distal end portions of the radially outer-side terminals 42k of the second winding bodies 42B, which are separate from each other by 180 degrees in electrical angle, are arranged so as to be held in contact with each other in the radial direction, as illustrated in FIG. 36, an oblique-side portion 42hs of each of the radially outer-side terminals 42h and an oblique-side portion 42hs of a corresponding one of the radially outer-side terminals 42k cross each other when viewed from the radially outer side. Specifically, the oblique-side portions 42hs of the radially outer-side terminals 42h of the first winding bodies 42A, which extend from the slots, are bent in the second circumferential direction. Meanwhile, the oblique-side portions 42ks of the radially outer-side terminals 42k of the second winding bodies 42B, which extend from the slots, are bent in the first circumferential direction.

More specifically, as illustrated in FIG. 37, when six radially outer-side terminals 42k of each of the sets are denoted as a radially outer-side terminal $42k_1$, a radially outer-side terminal $42k_2$, a radially outer-side terminal $42k_3$ ..., and a radially outer-side terminal $42k_6$ in the order of arrangement in the first circumferential direction for convenience, the first angle θ formed between the oblique-side portion $42ks$ of each of the radially outer-side terminals $42k_1$, $42k_2$, $42k_3$ ..., and $42k_6$, which is oriented forward in the first circumferential direction, and the end surface of the stator core 11 is constant. Second angles $\eta1$, $\eta2$, $\eta3$ ..., and $\eta6$ respectively formed between distal end portions $42ka$ of the radially outer-side terminals $42k_1$, $42k_2$, $42k_3$ ..., and $42k_6$, which are oriented in the first circumferential direction, and the end surface of the stator core 11 have a relationship of: $\eta1>\eta2>\eta3 \ldots >\eta6$. Specifically, the second angle $\eta$ gradually decreases in the first circumferential direction. A height position of a bent portion of the oblique-side portion $42ks$, at which the distal end portion $42ka$ of the radially outer-side terminal $42k$ is defined, from the end surface of the stator core 11 is set so as to gradually decrease in the first circumferential direction.

Meanwhile, when six radially outer-side terminals $42h$ of each of the sets are denoted as a radially outer-side terminal $42h_1$, a radially outer-side terminal $42h_2$, a radially outer-side terminal $42h_3$ ..., and a radially outer-side terminal $42h_6$ in the order of arrangement in the second circumferential direction for convenience, the first angle θ formed between the oblique-side portion $42hs$ of each of the radially outer-side terminals $42h_1$, $42h_2$, $42h_3$ ..., and $42h_6$, which is oriented forward in the second circumferential direction, and the end surface of the stator core 11 is constant. The second angle $\eta$ formed between a surface of a distal end portion $42ha$ of the radially outer-side terminal $42h_1$, $42h_2$, $42h_3$ ..., and $42h_6$, which is oriented forward in the second circumferential direction, and the end surface of the stator core 11 gradually decreases in the second circumferential direction. A height position of a bent portion of the oblique-side portion $42hs$, at which the distal end portion $42ha$ of the radially outer-side terminal $42h$ is defined, from the end surface of the stator core 11 is set so as to gradually decrease in the second circumferential direction.

A distal end portion $42ha$ of the radially outer-side terminal $42k$ and a distal end portion $42ka$ of the radially outer-side terminal $42h$, which are held in contact with each other in the radial direction, are located at the same height position from the end surface of the stator core 11.

Although not illustrated, even in the sets, each including six terminal pairs arranged in the circumferential direction so that the distal end portion of the radially inner-side terminal $42i$ of the first winding body $42A$ and the distal end portion of the radially inner-side terminal $42m$ of the second winding body $42B$ of each terminal pair, which are separate from each other by 180 degrees in electrical angle, are held in contact with each other in the radial direction, an oblique-side portion of each of the radially inner-side terminals $42i$ and an oblique-side portion of a corresponding one of the radially inner-side terminals $42m$ cross each other when viewed from the radially inner side.

More specifically, although not illustrated, when six radially inner-side terminals $42i$ of each of the sets are denoted as a radially inner-side terminal $42i_1$, a radially inner-side terminal $42i_2$, a radially inner-side terminal $42i_3$ ..., and a radially inner-side terminal $42i_6$ in the order of arrangement in the first circumferential direction for convenience, the first angle θ formed between the oblique-side portion of each of the radially inner-side terminals $42i_1$, $42i_2$, $42i_3$ ..., and $42i_6$, which is oriented forward in the first circumferential direction, and the end surface of the stator core 11 is constant. The second angle $\eta$ formed between a surface of a distal end portion of the radially outer-side terminal $42i_1$, $42i_2$, $42i_3$ ..., and $42i_6$, which is oriented forward in the first circumferential direction, and the end surface of the stator core 11 gradually decreases in the first circumferential direction. A height position of a bent portion of the oblique-side portion, at which the distal end portion of the radially inner-side terminal $42i$ is defined, from the end surface of the stator core 11 is set so as to gradually decrease in the first circumferential direction.

More specifically, although not illustrated, when six radially inner-side terminals $42m$ of each of the sets are denoted as a radially inner-side terminal $42m_1$, a radially inner-side terminal $42m_2$, a radially inner-side terminal $42m_3$ ..., and a radially inner-side terminal $42m_6$ in the order of arrangement in the second circumferential direction for convenience, the first angle θ formed between the oblique-side portion of each of the radially inner-side terminals $42m_1$, $42m_2$, $42m_3$ ..., and $42m_6$, which is oriented forward in the second circumferential direction, and the end surface of the stator core 11 is constant. The second angle $\eta$ formed between a surface of a distal end portion of the radially inner-side terminal $42m_1$, $42m_2$, $42m_3$ ..., and $42m_6$, which is oriented forward in the second circumferential direction, and the end surface of the stator core 11 gradually decreases in the second circumferential direction. A height position of a bent portion of the oblique-side portion, at which the distal end portion of the radially inner-side terminal $42m$ is defined, from the end surface of the stator core 11 is set so as to gradually decrease in the second circumferential direction.

A distal end portion $21fa$ of the radially inner-side terminal $42i$ and a distal end portion $21ha$ of the radially inner-side terminal $42m$, which are held in contact with each other in the radial direction, are located at the same height position from the end surface of the stator core 11.

Figure 38:
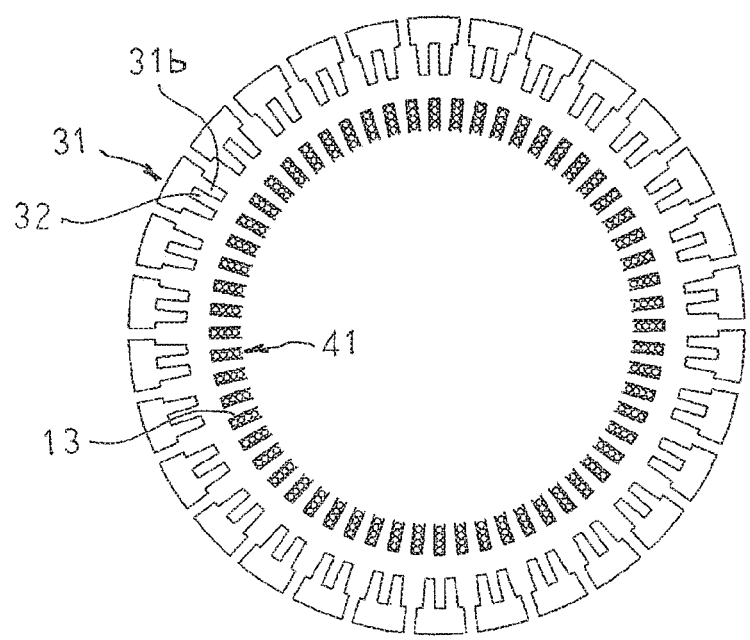
FIG. 38 is a view for illustrating a method of assembling the stator in the rotating electric machine according to the eighth embodiment of the present invention.
Figure 39:
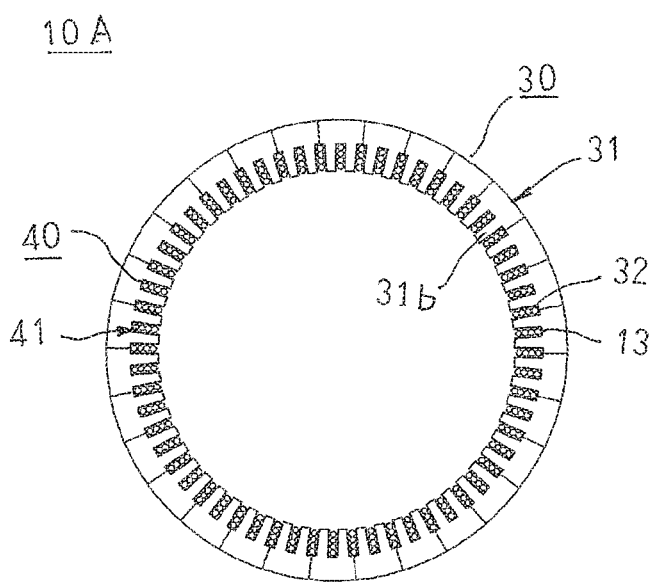
FIG. 39 is a view for illustrating the method of assembling the stator in the rotating electric machine according to the eighth embodiment of the present invention.

Next, an assembly method for the stator 10A is described with reference to FIG. 38 and FIG. 39. FIG. 38 and FIG. 39 are views for illustrating an assembly method for the stator in the rotating electric machine according to the eighth embodiment of the present invention. FIG. 38 is an illustration of a state before assembly of the stator, and FIG. 39 is an illustration of a state after the assembly of the stator.

First, the slot cells 13 are mounted to the rows, each including the first straight portion $42a$, the second straight portion $42b$, the third straight portion $42c$, and the fourth straight portion $42d$, in the winding assembly 41. Next, the thirty core blocks 31 are arranged, as illustrated in FIG. 38, at approximately equiangular pitches in the circumferential direction so that the teeth $31b$ are arranged on the radially outer side of spaces between adjacent ones of the rows, each including the first straight portion $42a$, the second straight portion $42b$, the third straight portion $42c$, and the fourth straight portion $42d$, in the winding assembly 41. Subsequently, the core blocks 31 arranged in the circumferential direction are moved radially inward. As a result, each of the teeth $31b$ of the core blocks 31 is inserted between the adjacent ones of the rows, each including the first straight portion $42a$, the second straight portion $42b$, the third straight portion $42c$, and the fourth straight portion $42d$.

The core blocks 31 arranged in the circumferential direction is moved further to the radially inner side. Then, circumferential side surfaces of adjacent ones of the core blocks 31 are brought into abutment against each other to hamper radially inward movement of the core blocks 31. As a result, as illustrated in FIG. 39, the winding assembly 41 is mounted to the stator core 30. Subsequently, the insulating sheets 16 are inserted between the radially inner-side terminals $42i$ and $42m$, which are held in contact with each other in the radial direction, and between the radially outer-side terminals $42h$ and $42k$, which are held in contact with each other in the radial direction. Subsequently, wire connection processing is performed for the winding assembly 41 as in the case of the first embodiment described above to thereby assemble the stator 10A.

Although not shown, a distance from an end surface of the stator core 30 to a bending start position (bending position in the circumferential direction) on the radially outer-side terminal 42k is longer than a distance from the end surface of the stator core 30 to a bending start position (bending position in the circumferential direction) at the displacement portion 42j of the radially outer-side terminal 42h. Further, a distance from the end surface of the stator core 30 to a bending start position (bending position in the circumferential direction) on the radially inner-side terminal 42i is longer than a distance from the end surface of the stator core 30 to a bending start position (bending position in the circumferential direction) at the displacement portion 42j of the radially inner-side terminal 42m.

According to the eighth embodiment, the same number as a total number of slots winding bodies 42 formed by distributed winding are mounted in the stator core 30 at one-slot pitches. Then, the winding bodies 42 are formed so that the radially inner-side terminals 42i and 42m, each being one end of the conductor 39, extend from a radially innermost position in the slot 32 toward the one axial side of the stator core 30 and the radially outer-side terminals 42h and 42k, each being another end of the conductor 39, extend from a radially outermost position in the slot 32 toward the one axial side of the stator core 30. Further, each phase winding of the stator winding 40 is formed by directly joining the radially inner-side terminals 42i and 42m of the winding bodies 42 for forming the same phase to each other and directly joining the radially outer-side terminals 42h and 42k thereof to each other.

Therefore, also in the eighth embodiment, the radially inner-side terminals 42i and 42m and the radially outer-side terminals 42h and 42k are not required to be caused to pass on an axially outer side of the first coil end group a. Thus, an axial dimension of the stator 10 can be reduced.

Further, another component such as a bus bar, which is configured to connect the terminals of the winding bodies 42 to each other, is not required. Thus, the number of components of the stator 10A can be reduced.

Further, the radially inner-side terminal 42i of the first winding body 42A maintains the fourth radial position from the radially outer side in the slot 32, and the radially outer-side terminal 42h is displaced radially inward from the first radial position from the radially outer side in the slot 32 by the width d of the conductor wire 39. The radially inner-side terminal 42m of the second winding body 42B is displaced radially inward from the fourth radial position from the radially outer side in the slot 32 by the width d of the conductor 39, and the radially outer-side terminal 42k maintains the first radial position from the radially outer side in the slot 32. In this manner, the radially inner-side terminal 42i can be led in the circumferential direction to be joined to a corresponding one of the radially inner-side terminals 42m without interference of the radially inner-side terminals 42m. Further, the radially outer-side terminal 42h can be led in the circumferential direction to be joined to a corresponding one of the radially outer-side terminals 42k without interference of the radially outer-side terminals 42k. Thus, radial projection of the second coil end group 41b can be reduced.

Six radially outer-side terminals 42k and six radially outer-side terminal 42h, which extend from the radially outermost position in the slots 12, are arranged so that a group of the six radially outer-side terminals 42k and a group of the six radially outer-side terminals 42h are arranged alternately in the circumferential direction. The six radially outer-side terminals 42k extend from the slots 12 and are then bent in the first circumferential direction. The six radially outer-side terminals 42h extend from the slots 12 and are then bent in the second circumferential direction so as to be brought closer to the radially outer-side terminals 42k being targets to be connected, which are separate from the radially outer-side terminals 42k by six slots, to be connected to the radially outer-side terminals 42k being the targets to be connected. Specifically, the radially outer-side terminals 42k and 42h are bent in the different circumferential directions for every six slots. In the set of six radially outer-side terminals 42k and six radially outer-side terminals 42h in which the group of the six radially outer-side terminals 42k and the group of the six radially outer-side terminals 42h are adjacent to each other in the circumferential direction, each of the radially outer-side terminals 42k and a corresponding one of the radially outer-side terminals 42h are bent so as to be brought closer to each other. Further, in the set of the radially outer-side terminals 42k and the radially outer-side terminals 42h, which are arranged so that a group of six radially outer-side terminals 42k and a group of six radially outer-side terminals 42h are adjacent to each other in the circumferential direction, the second angle η formed between the distal end portion 42ka of the radially outer-side terminal 42k and the end surface of the stator core 11 gradually decreases in the first circumferential direction, which is a bending direction of the oblique-side portions 42ks of the radially outer-side terminals 42k. Further, the second angle η formed between the distal end 42ha of the radially outer-side terminal 42h and the end surface of the stator core 11 gradually decreases in the second circumferential direction, which is a bending direction of the oblique-side portions 42hs of the radially outer-side terminals 42h. As a result, a distance between the connecting portions, each being formed between the distal end portion 42ha of the radially outer-side terminal 42h and the distal end portion 42ka of the radially outer-side terminal 42k adjacent to each other, which are held in contact with each other in the radial direction, can be increased. Thus, the insulating property can be improved.

Six radially inner-side terminals 42i and six radially inner-side terminal 42m, which extend from the radially innermost position in the slots 12, are arranged so that a group of the six radially inner-side terminals 42i and a group of the six radially inner-side terminals 42m are arranged alternately in the circumferential direction. The six radially inner-side terminals 42i extend from the slots 12 and are then bent in the first circumferential direction. The six radially inner-side terminals 42m extend from the slots 12 and are then bent in the second circumferential direction so as to be brought closer to the radially inner-side terminals 42i being targets to be connected, to be connected to the radially inner-side terminals 42i being the targets to be connected. Specifically, the radially inner-side terminals 42i and 42m are bent in the different circumferential directions for every six slots. In the set of six radially inner-side terminals 42i and six radially inner-side terminals 42m in which the group of the six radially inner-side terminals 42i and the group of the six radially inner-side terminals 42m are adjacent to each other in the circumferential direction, each of the radially inner-side terminals 42i and a corresponding one of the radially inner-side terminals 42m are bent so as to be brought closer to each other. Further, in the set of the radially inner-side terminals 42i and the radially inner-side terminals 42*m*, which are arranged so that a group of six radially outer-side terminals 42*i* and a group of six radially outer-side terminals 42*m* are adjacent to each other in the circumferential direction, the second angle η formed between the distal end portion of the radially inner-side terminal 42*i* and the end surface of the stator core 11 gradually decreases in the first circumferential direction, which is a bending direction of the oblique-side portions of the radially inner-side terminals 42*i*. Further, the first angle θ formed between the distal end of the radially inner-side terminal 42*m* and the end surface of the stator core 11 gradually decreases in the second circumferential direction, which is a bending direction of the oblique-side portions of the radially inner-side terminals 42*m*. As a result, a distance between the connecting portions, each being formed between the distal end portion of the radially inner-side terminal 42*i* and the distal end portion of the radially inner-side terminal 42 adjacent to each other, which are held in contact with each other in the radial direction, can be increased. Thus, the insulating property can be improved.

In the eighth embodiment described above, the second angle η formed between the distal portion of the radially outer-side terminal and the end surface of the stator core and between the distal portion of the radially inner-side terminal and the end surface of the stator core gradually decreases in a direction of being brought closer to the terminal to be joined. When insulating performance has a margin, the second angle η may be the same for a plurality of the oblique-side portions as long as the second angle η monotonously decreases in the direction of being brought closer to the terminal to be joined. For example, in FIG. 37, the second angles η1 to η6 may have a relationship of: η1=η2>η3>η4>η5>η6. Further, a potential difference between the terminals of the same phase is small. Thus, in a portion in which the terminals of the same phase are adjacent to each other in the circumferential direction, the second angle η may be set to the same angle.

Ninth Embodiment

Figure 40:
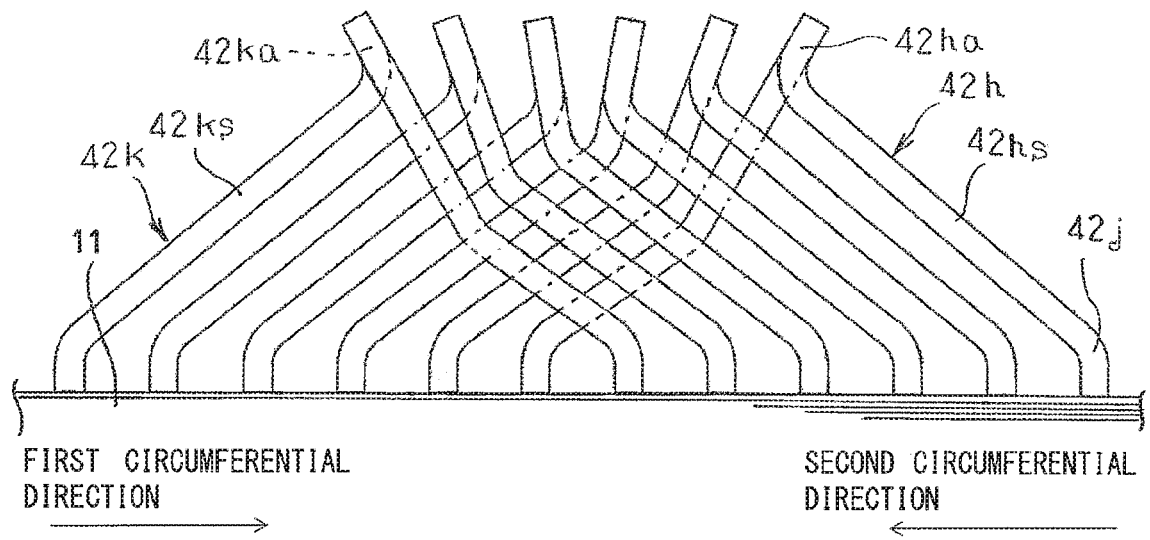
FIG. 40 is a side view of a main part, for illustrating a stator in a rotating electric machine according to a ninth embodiment of the present invention when viewed from a radially outer side.
Figure 41:
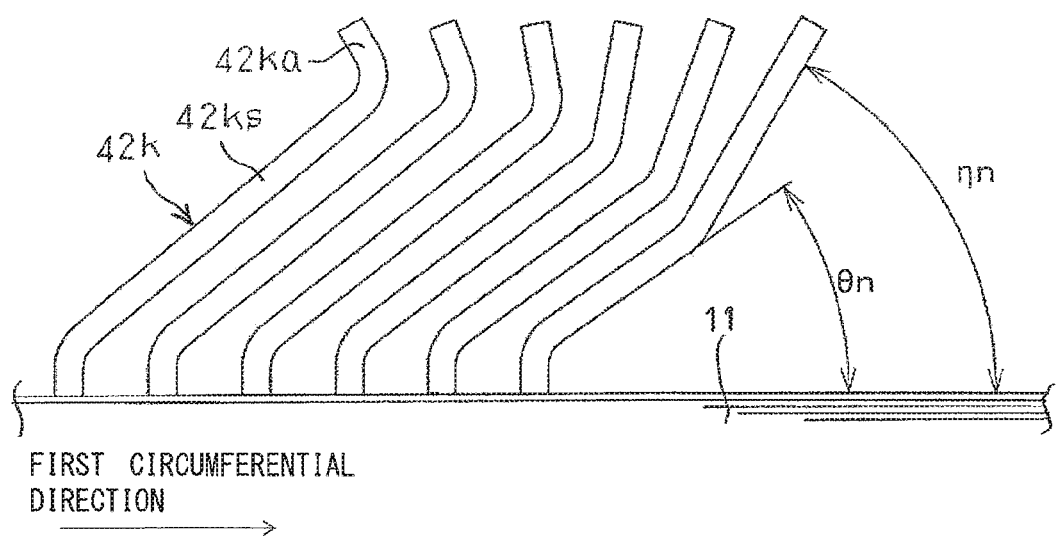
FIG. 41 is a view for illustrating bending shapes of radially outer-side terminals of a stator winding in the rotating electric machine according to the ninth embodiment of the present invention.

FIG. 40 is a side view of a main part, for illustrating a stator in a rotating electric machine according to a ninth embodiment of the present invention when viewed from a radially outer side. FIG. 41 is a view for illustrating bending shapes of radially outer-side terminals of a stator core in the rotating electric machine according to the ninth embodiment of the present invention. In FIG. 40 and FIG. 41, only the radially outer-side terminal are illustrated.

In the set of six terminal pairs arranged in the circumferential direction, in which the distal end portions of the radially outer-side terminals 42*ha* of the first winding bodies 42A and the distal end portions 42*ka* of the radially outer-side terminals 42*k* of the second winding bodies 42B, which are separate from each other by 180 degrees in electrical angle, are arranged so as to be held in contact with each other in the radial direction, as illustrated in FIG. 40 and FIG. 41. An oblique-side portion 42*fs* of each of the radially outer-side terminals 42*h* and an oblique-side portion 42*ks* of a corresponding one of the radially outer-side terminals 42*h* cross each other when viewed from the radially outer side. Specifically, the oblique-side portions 42*hs* of the radially outer-side terminals 42*h* of the first winding bodies 42A, which extend from the slots, are bent in the second circumferential direction. Meanwhile, the oblique-side portions 42*ks* of the radially outer-side terminals 42*k* of the second winding bodies 42B, which extend from the slots, are bent in a first circumferential direction.

The first angle θ formed between the surface of the oblique-side portion 42*ks* of each of the six radially outer-side terminals 42*k* of each set, which is oriented forward in the first circumferential direction, and the end surface of the stator core 11 gradually decreases in the first circumferential direction. The second angle η formed between the surface of the oblique-side portion 42*ka* of the radially outer-side terminal 42*k*, which is oriented forward in the first circumferential direction, and the end surface of the stator core 11 gradually decreases in the first circumferential direction. Further, the height position of the bent portion of the oblique-side portion 42*ks*, at which the distal end portion 42*ka* of the radially outer-side terminal 42*k* is defined, from the end surface of the stator core 11 is gradually decreased in the first circumferential direction.

Meanwhile, the first angle θ formed between the surface of the oblique-side portion 42*hs* of each of the six radially outer-side terminals 42*h* of each set, which is oriented forward in the second circumferential direction, and the end surface of the stator core 11 gradually decreases in the second circumferential direction. The second angle η formed between the surface of the oblique-side portion 42*ha* of the radially outer-side terminal 42*h*, which is oriented forward in the second circumferential direction, and the end surface of the stator core 11 gradually decreases in the second circumferential direction. Further, the height position of the bent portion of the oblique-side portion 42*hs*, at which the distal end portion 42*ha* of the radially outer-side terminal 42*h* is defined, from the end surface of the stator core 11 is gradually decreased in the first circumferential direction.

A distal end portion 42*ka* of the radially outer-side terminal 42*k* and a distal end portion 42*ha* of the radially outer-side terminal 42*h*, which are held in contact with each other in the radial direction, are located at the same height position from the end surface of the stator core 11.

Although not illustrated, even in the sets, each including six terminal pairs arranged in the circumferential direction so that the distal end portion of the radially inner-side terminal 42*i* of the first winding body 42A and the distal end portion of the radially inner-side terminal 42*m* of the second winding body 42B of each terminal pair, which are separate from each other by 180 degrees in electrical angle, similarly, an oblique-side portion of each of the radially inner-side terminals 42*i* and an oblique-side portion of a corresponding one of the radially inner-side terminals 42*m* cross each other when viewed from the radially inner side.

The first angle θ formed between the surface of the oblique-side portion of each of the six radially outer-side terminals 42*i* of each set, which is oriented forward in the first circumferential direction, and the end surface of the stator core 11 gradually decreases in the first circumferential direction. The second angle η formed between the surface of the oblique-side portion of the radially outer-side terminal 42*i*, which is oriented forward in the first circumferential direction, and the end surface of the stator core 11 gradually decreases in the first circumferential direction. Further, the height position of the bent portion of the oblique-side portion, at which the distal end portion of the radially outer-side terminal 42*i* is defined, from the end surface of the stator core 11 is gradually decreased in the first circumferential direction.

The first angle θ formed between the surface of the oblique-side portion of each of the six radially outer-side terminals 42*m* of each set, which is oriented forward in the second circumferential direction, and the end surface of the stator core 11 gradually decreases in the second circumferential direction. The second angle η formed between the surface of the oblique-side portion of the radially outer-side terminal 42*m*, which is oriented forward in the second circumferential direction, and the end surface of the stator core 11 gradually decreases in the second circumferential direction. Further, the height position of the bent portion of the oblique-side portion, at which the distal end portion of the radially outer-side terminal 42*m* is defined, from the end surface of the stator core 11 is gradually decreased in the second circumferential direction.

Further, a distal end portion of the radially outer-side terminal 42*i* and a distal end portion of the radially outer-side terminal 42*m*, which are held in contact with each other in the radial direction, are located at the same height position from the end surface of the stator core 11.

Other configurations are the same as those of the eighth embodiment described above.

Accordingly, even in the ninth embodiment, the same effects as those of the eighth embodiment described above are obtained.

According to the ninth embodiment, the first angle θ formed between the surface of the oblique-side portion 42*ks* of each of the six radially outer-side terminals 42*k* of each set and the end surface of the stator core 11 gradually decreases in the first circumferential direction, which is the bending direction of the oblique-side terminals 42*ks* of the radially outer-side terminals 42*k*. Thus, a distance between the oblique-side portions 42*ks* of the radially outer-side terminals 42*k* adjacent to each other is increased to improve the insulating property. Similarly, the first angle θ formed between the surface of the oblique-side portion 42*hs* of each of the six radially outer-side terminals 42*h* of each set and the end surface of the stator core 11 gradually decreases in the second circumferential direction, which is the bending direction of the oblique-side portions 42*hs* of the radially outer-side terminals 42*h*. Thus, a distance between the oblique-side portions 42*hs* of the radially outer-side terminals 42*h* adjacent to each other is increased to improve the insulating property. The first angle θ formed between the oblique-side portion of each of the six radially inner-side terminals 42*i* of each set and the end surface of the stator core 11 gradually decreases in the first circumferential direction, which is the bending direction of the oblique-side portions of the radially inner-side terminals 42*i*. Thus, a distance between the oblique-side portions of the radially inner-side terminals 42*i* adjacent to each other is increased to improve the insulating property. Similarly, the first angle θ formed between the oblique-side portion of each of the six radially inner-side terminals 42*m* of each set and the end surface of the stator core 11 gradually decreases in the second circumferential direction, which is the bending direction of the oblique-side portions of the radially inner-side terminals 42*m*. Thus, a distance between the oblique-side portions of the radially inner-side terminals 42*m* adjacent to each other is increased to improve the insulating property.

In the eighth and ninth embodiments described above, the application of the present invention to the stator using the winding bodies 42 has been described. However, the present invention may be applied to the stator using the winding bodies 21.

In the eighth and ninth embodiments described above, each of the winding bodies 42 is formed by continuously winding the conductor wire 39 one turn into the δ-shaped coil pattern. However, the winding body may be formed by winding the conductor wire 39 two or more turns into the δ-shaped coil pattern. Specifically, the winding body may be formed by arranging the δ-shaped coil patterns (winding bodies 42) in two or more rows in the radial direction so as to be continuously formed with use of a jumper wire for connecting winding ends of the δ-shaped coil patterns.

In each of the embodiments described above, the application of the rotating electric machine to the electric motor has been described. However, the same effects are provided even when the rotating electric machine is applied to a power generator.

Further, in each of the embodiments described above, the rotating electric machine having ten poles and sixty slots has been described above. However, the pole number p and the slot number S are not limited to ten poles and sixty slots.

In each of the embodiments described above, the slots are formed in a proportion of two slots per phase for each pole. However, a slot number q per phase for each pole is not limited to two, and may be one, or three or more. For example, the slot number q per phase for each pole is one, a distance between the row of the first straight portion and the row of the second straight portion of the winding bodies is a three-slot-angle distance (one magnetic-pole pitch). In this case, the bending direction of the radially outer-side terminal extending from the radially outermost position of the slot is different in the circumferential direction for every three slots.

In each of the embodiments described above, each of the winding bodies is formed as a winding formed by full-pitch winding. However, each of the winding bodies may be formed as a winding formed by fractional-pitch winding or long-pitch winding.

In each of the embodiments described above, the winding body is formed of one continuous conductor wire. However, the winding body may be formed with use of a plurality of conductors connected to each other as long as distributed winding is used.

Further, in each of the embodiments described above, vanish is not applied to the coil end group. However, vanish may be applied to the coil end group. As a result, firm fixation between the radially outer-side terminals, between the radially inner-side terminals, and between the radially outer-side terminals and the radially inner-side terminals, and the coil end group is achieved. Therefore, the radially outer-side terminals are not brought closer to each other and the radially inner-side terminals are not brought closer to each other due to vibration. Thus, the insulating property is improved.

REFERENCE SIGNS LIST

10, 10A stator, 11, 30 stator core, 12, 32 slot, 15 bead (connecting portion), 16 insulating sheet, 17 insulating member, 19, 39 conductor wire, 20, 40 stator winding, 21A, 21B winding body, 21*f*, 21*h* radially outer-side terminal, 21*fa*, 21*ha* distal end portion, 21*fs*, 21*hs* oblique-side portion, 21*e*, 21*g* radially inner-side terminal, 42A, 42B winding body, 42*h*, 42*k* radially outer-side terminal, 21*ha*, 21*ka* distal end portion, 21*hs*, 21*ks* oblique-side portion, 42*i*, 42*m* radially inner-side terminal, 50 thermistor (temperature detector)

The invention claimed is:

1. A rotating electric machine, comprising a stator including: a stator core having an annular shape, which includes slots arranged in a circumferential direction of the stator core; and a stator winding mounted to the stator core,
    wherein the stator winding includes a plurality of winding bodies formed by distributed winding, each being formed by winding a conductor wire a plurality of turns, which are inserted into a plurality of the slots to be mounted to the stator core;

wherein each of the winding bodies includes a radially inner-side terminal extending from a radially innermost position in a corresponding one of the slots to one axial side of the stator core and a radially outer-side terminal extending from a radially outermost position in a corresponding one of the slots to the one axial side of the stator core, wherein each of the radially inner-side terminals for forming each of phase windings of the stator winding among the radially inner-side terminals extends from a radially innermost position in a corresponding one of the slots on a one-by-one basis while a circumferential bending direction after the extension of the radially inner-side terminal from the corresponding slot is changed alternately for each group of n radially inner-side terminals, in which n is a natural number equal to or larger than 2, wherein each of the radially outer-side terminals for forming each of the phase windings of the stator winding among the radially outer-side terminals extends from a radially outermost position in a corresponding one of the slots on a one-by-one basis while a circumferential bending direction after the extension of the radially outer-side terminal from the corresponding slot is changed alternately for a group of n radially outer-side terminals, wherein each of the phase windings is formed by directly joining distal end portions of the radially inner-side terminals respectively extending from the slots being separate from each other by n slots to be bent so as to be brought closer to each other and directly joining distal end portions of the radially outer-side terminals respectively extending from the slots being separate from each other by n slots to be bent so as to be brought closer to each other, and wherein a first angle is formed between at least one of an oblique-side portion of each of the n radially inner-side terminals, which are continuous in the circumferential direction and are bent in the same circumferential bending direction, and an oblique-side portion of each of the n radially outer-side terminals, which are continuous in the circumferential direction and are bent in the circumferential bending direction, and an end surface of the stator core monotonously decreases in the circumferential bending direction.

2. The rotating electric machine according to claim 1, wherein the first angle gradually decreases in the circumferential bending direction.

3. The rotating electric machine according to claim 1, further comprising a temperature detector disposed between the oblique-side portions, which are adjacent to each other in the circumferential direction, among the n oblique-side portions for which the first angle monotonously decreases.

4. The rotating electric machine according to claim 1, wherein a second angle is formed between at least any one of a connecting portion between distal end portions of two of the n radially outer-side terminals, which are continuous in the circumferential direction, and a connecting portion between distal end portions of two of the n radially inner-side terminals, which are continuous in the circumferential direction, and the end surface of the stator core monotonously decreases in the circumferential bending direction.

5. The rotating electric machine according to claim 4, wherein the second angle gradually decreases in the circumferential bending direction.

6. The rotating electric machine according to claim 1, wherein each of a connecting portion between the radially outer-side terminals and a connecting portion between the radially inner-side terminals is coated with an insulating member.

7. The rotating electric machine according to claim 1, wherein the radially outer-side terminals are inclined radially outward so that connecting portions between the radially outer-side terminals are separate radially outward from a coil end group of the stator winding, and the radially inner-side terminals are inclined radially inward so that connecting portions between the radially inner-side terminals are separate radially inward from the coil end group of the stator winding.

8. The rotating electric machine according to claim 1,
wherein, in groups, each including the n radially outer-side terminals bent so that the n radially outer-side terminals of one of the groups and the n radially outer-side terminals of another one of the groups are brought closer to each other, a radial position of each of the radially outer-side terminals bent in one circumferential bending direction is offset radially outward by a radial width of the conductor wire with respect to a radial position of each of the radially outer-side terminals bent in another circumferential bending direction, and wherein, in groups, each including the n radially inner-side terminals bent so that the n radially inner-side terminals of one of the groups and the n radially inner-side terminals of another one of the groups are brought closer to each other, a radial position of each of the radially inner-side terminals bent in the one circumferential bending direction is offset radially inward by the radial width of the conductor wire with respect to a radial position of each of the radially inner-side terminals bent in the another circumferential bending direction.

9. The rotating electric machine according to claim 1, further comprising insulating sheets disposed between the radially outer-side terminals of different phases, which cross each other when viewed from a radial direction, and between the radially inner-side terminals of the different phases, which cross each other when viewed from the radial direction.

10. A rotating electric machine, comprising a stator including: a stator core having an annular shape, which includes slots arranged in a circumferential direction of the stator core; and a stator winding mounted to the stator core,
wherein the stator winding includes a plurality of winding bodies formed by distributed winding, each being formed by winding a conductor wire a plurality of turns, which are inserted into a plurality of the slots to be mounted to the stator core;

wherein each of the winding bodies includes a radially inner-side terminal extending from a radially innermost position in a corresponding one of the slots to one axial side of the stator core and a radially outer-side terminal extending from a radially outermost position in a corresponding one of the slots to the one axial side of the stator core, wherein each of the radially inner-side terminals for forming each of phase windings of the stator winding among the radially inner-side terminals extends from a radially innermost position in a corresponding one of the slots on a one-by-one basis while a circumferential bending direction after the extension of the radially inner-side terminal from the corresponding slot is changed alternately for each group of n radially inner-side terminals, in which n is a natural number equal to or larger than 2, wherein each of the radially outer-side terminals for forming each of the phase windings of the stator winding among the radially outer-side terminals extends from a radially outermost position in a corresponding one of the slots on a one-by-one basis while a circumferential bending direction after the extension of the radially outer-side terminal from the corresponding slot is changed alternately for a group of n radially outer-side terminals, wherein each of the phase windings is formed by directly joining distal end portions of the radially inner-side terminals respectively extending from the slots being separate from each other by n slots to be bent so as to be brought closer to each other, and directly joining distal end portions of the radially outer-side terminals respectively extending from the slots being separate from each other by n slots to be bent so as to be brought closer to each other, and wherein a second angle is formed between at least any one of a connecting portion between distal end portions of two of the n radially outer-side terminals, which are continuous in the circumferential direction, and a connecting portion between distal end portions of two of the n radially inner-side terminals, which are continuous in the circumferential direction, and the end surface of the stator core monotonously decreases in the circumferential bending direction.

11. The rotating electric machine according to claim 10, wherein the second angle gradually decreases in the circumferential bending direction.

12. The rotating electric machine according to claim 10, wherein each of a connecting portion between the radially outer-side terminals and a connecting portion between the radially inner-side terminals is coated with an insulating member.

13. The rotating electric machine according to claim 10, wherein the radially outer-side terminals are inclined radially outward so that connecting portions between the radially outer-side terminals are separate radially outward from a coil end group of the stator winding, and the radially inner-side terminals are inclined radially inward so that connecting portions between the radially inner-side terminals are separate radially inward from the coil end group of the stator winding.

14. The rotating electric machine according to claim 10, wherein, in groups, each including the n radially outer-side terminals bent so that the n radially outer-side terminals of one of the groups and the n radially outer-side terminals of another one of the groups are brought closer to each other, a radial position of each of the radially outer-side terminals bent in one circumferential bending direction is offset radially outward by a radial width of the conductor wire with respect to a radial position of each of the radially outer-side terminals bent in another circumferential bending direction, and wherein, in groups, each including the n radially inner-side terminals bent so that the n radially inner-side terminals of one of the groups and the n radially inner-side terminals of another one of the groups are brought closer to each other, a radial position of each of the radially inner-side terminals bent in the one circumferential bending direction is offset radially inward by the radial width of the conductor wire with respect to a radial position of each of the radially inner-side terminals bent in the another circumferential bending direction.

15. The rotating electric machine according to claim 10, further comprising insulating sheets disposed between the radially outer-side terminals of different phases, which cross each other when viewed from a radial direction, and between the radially inner-side terminals of the different phases, which cross each other when viewed from the radial direction.

* * * * *